United States Patent
Zhou et al.

(10) Patent No.: US 11,228,515 B2
(45) Date of Patent: Jan. 18, 2022

(54) DATA PACKET DETECTION METHOD, DEVICE, AND SYSTEM

(71) Applicant: HUAWEI TECHNOLOGIES CO., LTD., Guangdong (CN)

(72) Inventors: Tianran Zhou, Beijing (CN); Haoyu Song, Santa Clara, CA (US); Zhenbin Li, Beijing (CN); Yunan Gu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/113,104

(22) Filed: Dec. 7, 2020

(65) Prior Publication Data

US 2021/0092061 A1    Mar. 25, 2021

Related U.S. Application Data

(63) Continuation of application No. PCT/CN2019/082358, filed on Apr. 12, 2019.

(30) Foreign Application Priority Data

Jun. 6, 2018 (CN) .......................... 201810574118.3

(51) Int. Cl.
    H04L 12/26        (2006.01)
(52) U.S. Cl.
    CPC ............ *H04L 43/08* (2013.01); *H04L 43/065* (2013.01); *H04L 43/0829* (2013.01)

(58) Field of Classification Search
CPC ... H04L 43/08; H04L 43/0829; H04L 43/065; H04L 43/028; H04L 43/50
See application file for complete search history.

(56) References Cited

U.S. PATENT DOCUMENTS

| 8,078,668 | B2 * | 12/2011 | Moreau ................. H04L 69/329 709/203 |
| 9,300,579 | B2 | 3/2016 | Frost et al. |
| 9,397,913 | B1 * | 7/2016 | Nimmagadda ..... H04L 43/0835 |
| 10,095,864 | B2 * | 10/2018 | Hunt ................... H04L 63/1425 |

(Continued)

FOREIGN PATENT DOCUMENTS

| CN | 101699786 A | 4/2010 |
| CN | 101800679 A | 8/2010 |

(Continued)

*Primary Examiner* — Aaron N Strange

(57) ABSTRACT

A data packet detection method, a device, and a system are disclosed. The method includes: receiving first control information sent by a controller; receiving a first data packet sent by a previous-hop network device of a first network device, where the first data packet includes first detection information, and the first detection information includes a first detection node identifier, a first sequence number, and first collection information; determining, based on the first collection information, first collected data corresponding to the first collection information, and updating the first detection node identifier; and sending, to a next-hop network device of the first network device, the first data packet carrying the updated first detection information. This implements information telemetry on a data packet on a transmission path.

25 Claims, 5 Drawing Sheets

(56) References Cited

U.S. PATENT DOCUMENTS

| | | | |
|---|---|---|---|
| 10,461,992 B1* | 10/2019 | Sagar | H04L 43/0817 |
| 10,547,500 B1* | 1/2020 | Hardman | H04L 41/065 |
| 2006/0069793 A1* | 3/2006 | Li | H04L 69/10 |
| | | | 709/231 |
| 2006/0285500 A1* | 12/2006 | Booth, III | H04L 43/0829 |
| | | | 370/250 |
| 2008/0159287 A1* | 7/2008 | Nagarajan | H04L 69/22 |
| | | | 370/392 |
| 2013/0010600 A1 | 1/2013 | Jocha et al. | |
| 2014/0189443 A1* | 7/2014 | Xu | H04L 1/00 |
| | | | 714/48 |
| 2014/0362682 A1* | 12/2014 | Guichard | H04L 43/50 |
| | | | 370/221 |
| 2015/0281036 A1 | 10/2015 | Sun et al. | |
| 2016/0057250 A1 | 2/2016 | Sakai et al. | |
| 2016/0105346 A1* | 4/2016 | Pignataro | H04L 63/065 |
| | | | 370/253 |
| 2017/0038152 A1 | 2/2017 | Liu et al. | |
| 2017/0250907 A1 | 8/2017 | Pignataro et al. | |
| 2017/0295055 A1 | 10/2017 | Melman | |
| 2017/0346709 A1* | 11/2017 | Menon | H04L 43/0829 |
| 2019/0260657 A1* | 8/2019 | Filsfils | H04L 43/0829 |

FOREIGN PATENT DOCUMENTS

| | | | |
|---|---|---|---|
| CN | 104506369 A | 4/2015 | |
| CN | 107147508 A | 9/2017 | |
| EP | 3101844 A1 | 12/2016 | |
| WO | WO-2009118540 A1 * | 10/2009 | H04L 47/26 |
| WO | 2017070023 A1 | 4/2017 | |
| WO | 2017151565 A1 | 9/2017 | |
| WO | 2017222993 A1 | 12/2017 | |

* cited by examiner

DATA PACKET DETECTION METHOD, DEVICE, AND SYSTEM

CROSS-REFERENCE TO RELATED APPLICATIONS

This application is a continuation of International Application No. PCT/CN2019/082358, filed on Apr. 12, 2019, which claims priority to Chinese Patent Application No. 201810574118.3, filed on Jun. 6, 2018. The disclosures of the aforementioned applications are hereby incorporated by reference in their entireties.

TECHNICAL FIELD

This application relates to the field of communications technologies, and in particular, to a data packet detection method, a device, and a system.

BACKGROUND

Operation, administration, and maintenance (operation administration and maintenance, OAM) is a technology providing transmission path status detection for a network. Network devices that communicate with each other detect, by using a sent OAM packet, whether a data packet transmission path is normal. Specifically, a first network device may construct an OAM detection packet based on the OAM technology, and the first network device sends the OAM detection packet to a second network device through a to-be-detected transmission path. After receiving the OAM detection packet, the second network device determines a status of the transmission path by analyzing the OAM detection packet.

However, it cannot be ensured that a transmission path of a conventional OAM detection packet is consistent with a transmission path of a data flow. When load sharing is performed on the to-be-detected transmission path, the transmission path of the OAM detection packet is less consistent with the transmission path of the data flow.

Internet protocol (Internet Protocol, IP) flow performance measurement (Flow Performance Measurement, FPM) is a measurement method for obtaining a network performance indicator, such as packet loss statistics or a service path delay, by directly measuring a data flow between a plurality of nodes. In the IP FPM technology, a data packet included in a data flow is colored, to carry and transmit detection information. Specifically, the first network device colors a specific data bit included in the data packet in the data flow, and then the first network device sends the data packet carrying a color flag to the second network device. The second network device identifies and counts the received data packet carrying the color flag, to determine performance of a transmission path.

However, the IP FPM technology provides coloring for only a data packet. Consequently, in the IP FPM technology, a data transmission path cannot be identified. In addition, in the IP FPM technology, only per-flow detection can be implemented, but per-packet detection cannot be implemented.

SUMMARY

In view of this, embodiments of this application provide a data packet detection method, a device, and a system, to implement information telemetry on a data packet on a transmission path by encapsulating detection information into the data packet on the transmission path, thereby implementing information collection on the data packet on the transmission path while ensuring packet forwarding performance.

Technical solutions provided in the embodiments of this application are as follows.

According to a first aspect, a data packet detection method is provided. The method includes: receiving, by a first network device, first control information sent by a controller, where the first control information includes a detection task type, and the detection task type indicates a detection task that the controller requires the first network device to perform; receiving, by the first network device, a first data packet sent by a previous-hop network device of the first network device, where the first data packet includes first detection information, the first detection information includes a first detection node identifier, a first sequence number, and first collection information, the first detection node identifier indicates a location, in a detection domain, of a network device processing the first detection information, the first sequence number indicates a sequence number of the first data packet including the first detection information, the first collection information indicates collection information corresponding to the detection task type, the detection domain is a detection range determined by the controller, the detection domain includes a plurality of network devices, and the plurality of network devices include the first network device; determining, by the first network device based on the first collection information, first collected data corresponding to the first collection information, and updating, by the first network device, the first detection node identifier; and sending, by the first network device to a next-hop network device of the first network device, the first data packet carrying the updated first detection information.

According to the solution provided in this embodiment, network devices in the detection domain may implement, based on control information delivered by the controller and by using detection information included in a data packet, information collection for a detection task required by the controller, thereby implementing in-situ collection on a data packet on a transmission path and transmission path detection while ensuring packet forwarding performance.

In a possible implementation of the first aspect, the first network device is a head node device in the detection domain, and after the receiving, by the first network device, a first data packet sent by a previous-hop network device of the first network device, the method further includes: encapsulating, by the first network device, the first detection information into the first data packet.

In another possible implementation of the first aspect, the first network device is an end node device in the detection domain, and before the sending, by the first network device to a next-hop network device of the first network device, the first data packet carrying the updated first detection information, the method further includes: deleting, by the first network device, the first detection information from the first data packet.

In still another possible implementation of the first aspect, the method further includes: sending, by the first network device, first reported detection information to the controller, where the first reported detection information includes the updated first detection node identifier, the first sequence number, and the first collected data.

In still another possible implementation of the first aspect, the detection task type is packet loss detection, the first control information further includes a detection start moment and a detection end moment, the first network device is the head node device in the detection domain, the first data packet is the $1^{st}$ data packet sent, in a time period starting from the detection start moment, by the first network device to the next-hop network device of the first network device, the first collected data includes a device identifier of the first network device, and the method further includes: receiving, by the first network device, a second data packet sent by the previous-hop network device of the first network device; encapsulating, by the first network device, second detection information into the second data packet, where the second detection information includes a second detection node identifier, a second sequence number, and second collection information; determining, by the first network device based on the second collection information, second collected data corresponding to the second collection information, and updating, by the first network device, the second detection node identifier, where the second collected data includes the device identifier of the first network device, the second sequence number is greater than the first sequence number, and the second detection node identifier is the same as the first detection node identifier; sending, by the first network device to the next-hop network device of the first network device, the second data packet carrying the updated second detection information, where the second data packet is the last data packet sent by the first network device to the next-hop network device of the first network device before the detection end moment; and sending, by the first network device, first reported detection information and second reported detection information to the controller, where the first reported detection information includes the updated first detection node identifier, the first sequence number, and the first collected data, and the second reported detection information includes the updated second detection node identifier, the second sequence number, and the second collected data.

In still another possible implementation of the first aspect, the detection task type is packet loss detection, the first control information further includes a detection start moment and a detection end moment, the first network device is an intermediate node device or an end node device in the detection domain, the first collected data includes a device identifier of the first network device, and the method further includes: extending, by the first network device, a value of the detection end moment by preset duration, and updating the value of the detection end moment; receiving, by the first network device in a time period from the detection start moment to the updated detection end moment, a second data packet sent by the previous-hop network device of the first network device, where the second data packet includes second detection information, and the second detection information includes a second detection node identifier, a second sequence number, and second collection information; determining, by the first network device based on the second collection information, second collected data corresponding to the second collection information, and updating, by the first network device, the second detection node identifier, where the second collected data includes the device identifier of the first network device, the second sequence number is a largest sequence number in sequence numbers of a plurality of data packets that are received by the first network device in the time period, the first data packet is a data packet received by the first network device in the time period, and the first sequence number is a smallest sequence number in the sequence numbers of the plurality of data packets that are received by the first network device in the time period; sending, by the first network device to the next-hop network device of the first network device, the second data packet carrying the updated second detection information; generating, by the first network device, third reported detection information, where the third reported detection information includes a third detection node identifier, a third sequence number, and third collected data, the third detection node identifier is the same as the updated second detection node identifier, the third collected data includes the device identifier of the first network device, the third sequence number is a sequence number missing from the sequence numbers of the plurality of data packets that are received by the first network device in the time period, and the third sequence number is greater than the first sequence number and less than the second sequence number; and sending, by the first network device, first reported detection information, second reported detection information, and the third reported detection information to the controller, where the first reported detection information includes the updated first detection node identifier, the first sequence number, and the first collected data, and the second reported detection information includes the updated second detection node identifier, the second sequence number, and the second collected data.

According to a second aspect, a data packet detection method is provided. The method includes: determining, by a controller, a detection domain, where the detection domain is a detection range determined by the controller, and the detection domain includes a plurality of network devices; sending, by the controller, first control information to the plurality of network devices, where the first control information includes a detection task type, and the detection task type indicates a detection task that the controller requires the plurality of network devices to perform; and receiving, by the controller, first reported detection information sent by a first network device, where the first reported detection information is determined by the first network device based on first detection information, the first detection information is detection information obtained by the first network device from a first data packet before the first network device sends the first data packet to a next-hop network device of the first network device, the first reported detection information includes a first detection node identifier, a first sequence number, and first collected data, the first detection node identifier indicates a location, in the detection domain, of a network device processing the first detection information, the first sequence number indicates a sequence number of the first data packet including the first detection information, the first collected data is collected data, corresponding to first collection information, that is determined by the first network device based on the first collection information in the first detection information, the first collection information indicates collection information corresponding to the detection task type, and the plurality of network devices include the first network device.

According to the solution provided in this embodiment, network devices in the detection domain may implement, based on control information delivered by the controller and by using detection information included in a data packet, information collection for a detection task required by the controller, thereby implementing in-situ collection on a data packet on a transmission path and transmission path detection while ensuring packet forwarding performance.

In a possible implementation of the second aspect, the detection task type is packet loss detection, the first control information further includes a detection start moment and a detection end moment, the first network device is a head node device in the detection domain, the first data packet is the $1^{st}$ data packet sent, in a time period starting from the detection start moment, by the first network device to the next-hop network device of the first network device, the first collected data includes a device identifier of the first network device, and the method further includes: receiving, by the controller, second reported detection information sent by the first network device, where the second reported detection information is determined by the first network device based on second detection information, the second detection information is detection information obtained by the first network device from a second data packet before the first network device sends the second data packet to the next-hop network device of the first network device, the second reported detection information includes a second detection node identifier, a second sequence number, and second collected data, the second collected data includes the device identifier of the first network device, the second sequence number is greater than the first sequence number, the second detection node identifier is the same as the first detection node identifier, and the second data packet is the last data packet sent by the first network device to the next-hop network device of the first network device before the detection end moment.

In another possible implementation of the second aspect, the method further includes: receiving, by the controller, third reported detection information sent by a second network device, where the third reported detection information includes a third detection node identifier and third collected data, the third detection node identifier indicates a location of the second network device in the detection domain, the third collected data includes a device identifier of the second network device, the third reported detection information further includes a third sequence number, a fourth sequence number, and a fifth sequence number, the third sequence number is a smallest sequence number in sequence numbers of a plurality of data packets received by the second network device in a time period from the detection start moment to a moment obtained by extending the detection end moment by preset duration, the fourth sequence number is a sequence number missing from the sequence numbers of the plurality of data packets received by the second network device in the time period, the fifth sequence number is a largest sequence number in the sequence numbers of the plurality of data packets received by the second network device in the time period, the second network device is an intermediate node device or an end node device in the detection domain, and the plurality of network devices include the second network device.

In still another possible implementation of the second aspect, the method further includes: determining, by the controller, a packet loss rate based on the first reported detection information, the second reported detection information, and the third reported detection information.

In still another possible implementation of the second aspect, the method further includes: determining, by the controller, fourth reported detection information based on the fourth sequence number, where a value of a fourth detection node identifier included in the fourth reported detection information is smallest in all reported detection information, including the fourth sequence number, that is received by the controller; and determining, by the controller, a packet loss locating node based on fourth collected data included in the fourth reported detection information.

In any one of the first aspect and the possible implementations of the first aspect, or in any one of the second aspect and the possible implementations of the second aspect, optionally, the first detection information further includes a flow identifier, and the flow identifier indicates a data flow to which the first data packet belongs.

In any one of the first aspect and the possible implementations of the first aspect, or in any one of the second aspect and the possible implementations of the second aspect, optionally, the first detection information further includes a first length and a first version number, the first length indicates a length of the first detection information, and the first version number indicates a protocol version of the first detection information.

According to a third aspect, a first network device is provided. The first network device has a function of implementing behavior of the first network device in the foregoing method. The function may be implemented based on hardware, or may be implemented based on hardware executing corresponding software. The hardware or software includes one or more modules corresponding to the foregoing function.

In a possible design, a structure of the first network device includes a processor and an interface. The processor is configured to support the first network device in performing a corresponding function in the foregoing method. The interface is configured to: support communication between the first network device and a second network device; and send information or an instruction in the foregoing method to the second network device, or receive information or an instruction in the foregoing method from the second network device. The first network device may further include a memory. The memory is configured to be coupled to the processor, and stores a program instruction and data that are necessary for the first network device.

In another possible design, the first network device includes a processor, a transmitter, a receiver, a random access memory, a read-only memory, and a bus. The processor is coupled to the transmitter, the receiver, the random access memory, and the read-only memory through the bus. When the first network device needs to run, a bootloader in a basic input/output system or an embedded system that is built into the read-only memory is used to boot a system to start, and boot the first network device to enter a normal running state. After entering the normal running state, the first network device runs an application program and an operating system in the random access memory, so that the processor performs the method in any one of the first aspect and the possible implementations of the first aspect.

According to a fourth aspect, a first network device is provided. The first network device includes a main control board and an interface board, and may further include a switching board. The first network device is configured to perform the method in any one of the first aspect and the possible implementations of the first aspect. Specifically, the first network device includes a module configured to perform the method in any one of the first aspect and the possible implementations of the first aspect.

According to a fifth aspect, a first network device is provided. The first network device includes a controller and a first forwarding sub-device. The first forwarding sub-device includes an interface board, and may further include a switching board. The first forwarding sub-device is configured to perform a function of the interface board in the fourth aspect, and may further perform a function of the switching board in the fourth aspect. The controller includes a receiver, a processor, a transmitter, a random access memory, a read-only memory, and a bus. The processor is coupled to the receiver, the transmitter, the random access memory, and the read-only memory through the bus. When the controller needs to run, a bootloader in a basic input/ output system or an embedded system that is built into the read-only memory is used to boot a system to start, and boot the controller to enter a normal running state. After entering the normal running state, the controller runs an application program and an operating system in the random access memory, so that the processor performs a function of the main control board in the fourth aspect.

According to a sixth aspect, a computer storage medium is provided and is configured to store a program, code, or an instruction used by the foregoing first network device. When executing the program, code, or instruction, a processor or a hardware device may perform a function or a step of the first network device in the foregoing aspects.

According to a seventh aspect, a controller is provided. The controller has a function of implementing behavior of the controller in the foregoing method. The function may be implemented based on hardware, or may be implemented based on hardware executing corresponding software. The hardware or software includes one or more modules corresponding to the foregoing function.

In a possible design, a structure of the controller includes a processor and an interface. The processor is configured to support the controller in performing a corresponding function in the foregoing method. The interface is configured to: support communication between the controller and a second network device, and send information or an instruction in the foregoing method to the second network device, or receive information or an instruction in the foregoing method from the second network device. The controller may further include a memory. The memory is configured to be coupled to the processor, and stores a program instruction and data that are necessary for the controller.

In another possible design, the controller includes a processor, a transmitter, a receiver, a random access memory, a read-only memory, and a bus. The processor is coupled to the transmitter, the receiver, the random access memory, and the read-only memory through the bus. When the controller needs to run, a bootloader in a basic input/output system or an embedded system that is built into the read-only memory is used to boot a system to start, and boot the controller to enter a normal running state. After entering the normal running state, the controller runs an application program and an operating system in the random access memory, so that the processor performs the method in any one of the second aspect and the possible implementations of the second aspect.

According to an eighth aspect, a controller is provided. The controller includes a main control board and an interface board, and may further include a switching board. The controller is configured to perform the method in any one of the second aspect and the possible implementations of the second aspect. Specifically, the controller includes a module configured to perform the method in any one of the first aspect and the possible implementations of the second aspect.

According to a ninth aspect, a controller is provided. The controller includes a main control device and a first forwarding sub-device. The first forwarding sub-device includes an interface board, and may further include a switching board. The first forwarding sub-device is configured to perform a function of the interface board in the eighth aspect, and may further perform a function of the switching board in the eighth aspect. The main control device includes a receiver, a processor, a transmitter, a random access memory, a read-only memory, and a bus. The processor is coupled to the receiver, the transmitter, the random access memory, and the read-only memory through the bus. When the main control device needs to run, a bootloader in a basic input/output system or an embedded system that is built into the read-only memory is used to boot a system to start, to boot the main control device to enter a normal running state. After entering the normal running state, the main control device runs an application program and an operating system in the random access memory, so that the processor performs a function of the main control board in the eighth aspect.

According to a tenth aspect, a computer storage medium is provided and is configured to store a program, code, or an instruction used by the foregoing controller. When executing the program, code, or instruction, a processor or a hardware device may perform a function or a step of the controller in the foregoing aspects.

According to an eleventh aspect, a network system is provided. The network system includes a first network device and a controller. The first network device is the first network device in the third aspect, the fourth aspect, or the fifth aspect. The controller is the controller in the seventh aspect, the eighth aspect, or the ninth aspect.

According to the data packet detection method provided in the embodiments of this application, specifically, the embodiments of this application provide an in-situ flow information telemetry (in-situ flow information telemetry or in-band flow information telemetry) method. Network devices in the detection domain may implement, based on control information delivered by the controller and by using detection information included in a data packet, information collection for a detection task required by the controller, thereby implementing in-situ collection on a data packet on a transmission path and transmission path detection while ensuring packet forwarding performance.

DESCRIPTION OF EMBODIMENTS

The following separately provides detailed descriptions by using specific embodiments.

Figure 1:
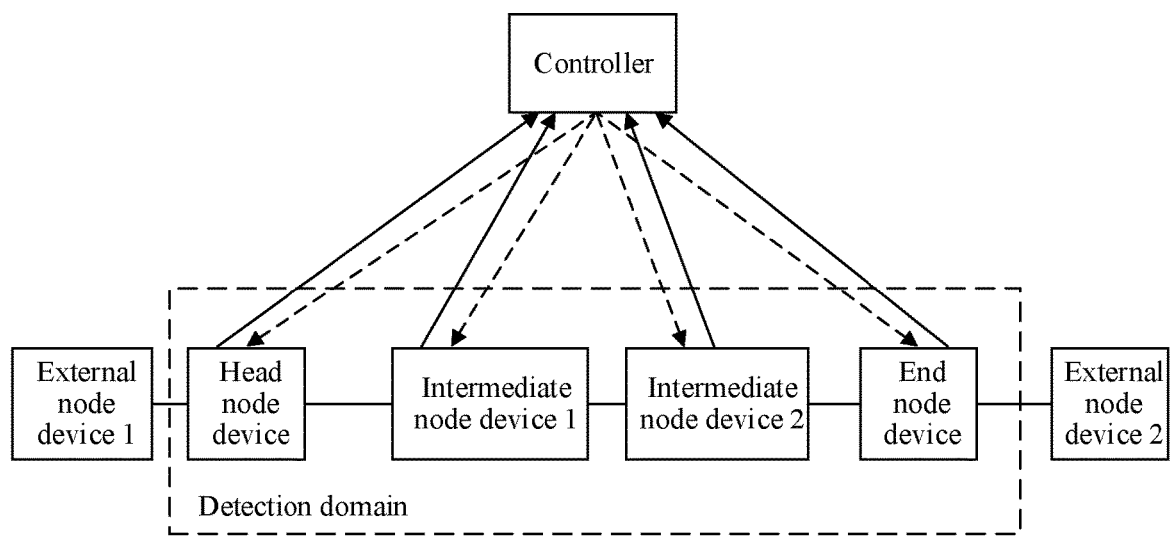
FIG. 1 is a schematic structural diagram of a network according to an embodiment of this application.

FIG. 1 is a schematic structural diagram of a network according to an embodiment of this application. The network includes a controller and a plurality of network devices. The plurality of network devices are connected to each other through a communication link, to transmit a data flow. As shown in FIG. 1, an external node device 1, a head node device, an intermediate node device 1, an intermediate node device 2, an end node device, and an external node device 2 are sequentially connected through the communication link. A data flow may start from the external node device 1, pass through the head node device, the intermediate node device 1, the intermediate node device 2, and the end node device, and arrive at the external node device 2.

The controller may be configured to perform information collection on a data packet on a transmission path between the plurality of network devices and perform transmission path performance detection. The transmission path performance detection includes detection for a packet loss rate and packet loss locating. In this embodiment of this application, the transmission path may include a path through which a data flow passes. The controller may determine a detection domain, and the detection domain is a detection range determined by the controller. Specifically, in a possible implementation, a network engineer sends device information of a to-be-detected transmission path to the controller through a network management device or user equipment. The device information includes a head node device identifier and an end node device identifier of the to-be-detected transmission path. The controller may receive the device information through, for example, a northbound interface (northbound interface, NBI). In another possible implementation, the controller determines a head node device identifier and an end node device identifier of a to-be-detected transmission path according to a preset control policy. The controller may obtain a topology of the plurality of network devices in the network, so that the controller determines the head node device identifier and the end node device identifier of the to-be-detected transmission path based on the topology of the plurality of network devices. For example, the preset control policy is to perform detection information collection and performance detection on a transmission path between forwarding devices included in a data center (data center, DC). The controller determines the head node device identifier and the end node device identifier of the to-be-detected transmission path based on a topology in the DC.

The controller determines the detection domain based on the head node device identifier and the end node device identifier, and determines a head node device and an end node device in the detection domain. On the transmission path in the detection domain, a network device located between the head node device and the end node device is an intermediate node device, for example, the intermediate node device 1 and the intermediate node device 2 in FIG. 1.

Optionally, the controller may further determine a flow identifier. The network engineer may send the flow identifier to the controller through the network management device or the user equipment, or the controller determines the flow identifier according to the preset control policy. The flow identifier is used to identify a data flow. The controller determines, by using the flow identifier, a specific data flow, on the to-be-detected transmission path, on which detection information collection is to be performed.

In the detection domain shown in FIG. 1, the head node device, the intermediate node device 1, the intermediate node device 2, and the end node device communicate with each other through one transmission path. In a possible implementation, the detection domain in FIG. 1 may include a plurality of transmission paths. For example, the intermediate node device 1 is connected to an intermediate node device 3 (not shown) through a link, and the intermediate node device 3 is connected to the end node device through a link. In this way, a data flow can be sent from the intermediate node device 1 to the intermediate node device 2 and the intermediate node device 3 through load sharing.

Figure 2:
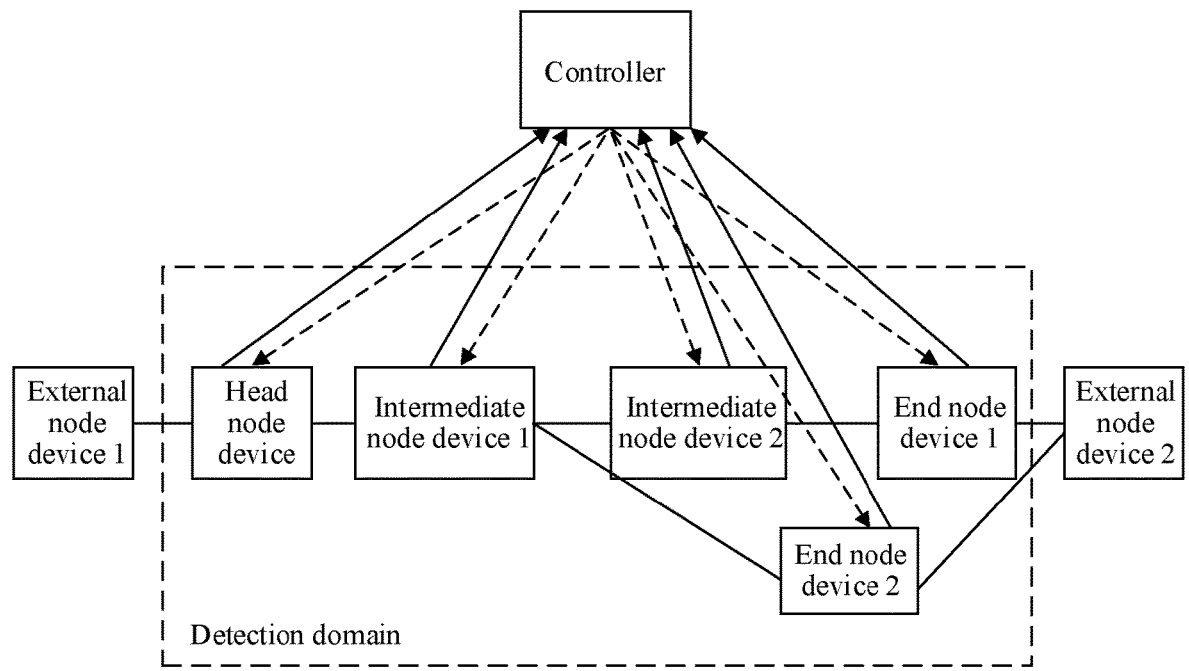
FIG. 2 is a schematic structural diagram of another network according to an embodiment of this application.

FIG. 2 is a schematic structural diagram of another network according to an embodiment of this application. Based on the network structure shown in FIG. 1, an end node device 2 is added in FIG. 2. Correspondingly, the end node device in FIG. 1 is represented as an end node device 1 in FIG. 2. The end node device 2 is connected to an intermediate node device 1 through a link, and the end node device 2 is further connected to an external node device 2 through a link. In a detection domain shown in FIG. 2, there are a plurality of transmission path egresses (two egresses in FIG. 2). To be specific, the end node device 1 is connected to the external node device 2 through a port of the end node device 1, and the end node device 2 is connected to the external node device 2 through a port of the end node device 2. In this way, a data flow can be sent from the intermediate node device 1 to an intermediate node device 2 and the end node device 2 through load sharing.

The controller communicates with each network device in the detection domain through a communication link. The controller may send control information to the head node device, the intermediate node device, and the end node device in the detection domain (as shown by dashed lines with arrows directed from the controller towards each network device in the detection domain in FIG. 1 and FIG. 2). The control information includes a detection task type. The detection task type indicates a detection task that the controller requires a network device in the detection domain to perform. For example, the detection task type is packet loss detection. In this case, the head node device in the detection domain determines, for the detection task type of packet loss detection, collection information in detection information included in a data packet. The collection information indicates to collect a device identifier. The head node device collects a device identifier of the head node device according to the indication of the collection information. The head node device generates reported detection information. The reported detection information is corresponding to the detection information, and the reported detection information includes the device identifier of the head node device. The head node device sends, to a next-hop network device (the intermediate node device) of the head node device, the data packet carrying the detection information. The detection information further includes a detection node identifier and a sequence number. The detection node identifier indicates a location, in the detection domain, of a network device (for example, the head node device) processing the detection information, and the sequence number indicates a sequence number of the data packet including the detection information. In this way, the intermediate node device and the end node device in the detection domain each collect a device identifier according to the indication of the collection information in the detection information in the foregoing implementation, and update the detection node identifier in the detection information. In this way, the detection information is transmitted on a transmission path in the detection domain along with the data packet, and a network device through which the data packet passes may perform data collection based on the detection information in the data packet.

The controller further sends, to the head node device determined by the controller, information carrying a head node identifier. The head node identifier may be represented by using a device identifier, a device IP address, or the like. After receiving the head node identifier, the head node device may determine, based on the head node identifier, that the head node device is the head node device, so that the head node device may encapsulate the detection information into the data packet. Optionally, the head node identifier may be carried in the foregoing control information sent by the controller to the head node device.

The controller further sends, to the end node device determined by the controller, information carrying an end node identifier. The end node identifier may be represented by using a device identifier, a device IP address, or the like. After receiving the end node identifier, the end node device may determine, based on the end node identifier, that the end node device is the end node device, so that the end node device may encapsulate the detection information into the data packet. Optionally, the end node identifier may be carried in the foregoing control information sent by the controller to the end node device.

The control information may further include a flow identifier, so that a network device in the detection domain detects a data flow indicated by the flow identifier. In this embodiment of this application, data flows may be distinguished based on service types of transmission data, for example, a video flow and a voice flow; or data flows may be distinguished based on some or all information in quintuple information. The flow identifier may be identifier information directly configured by the controller or a network management device, or may be identifier information determined by the controller or a network management device based on the quintuple information.

Each network device in the detection domain may send reported detection information to the controller (as shown by solid lines with arrows directed from each network device towards the controller in the detection domain in FIG. 1 and FIG. 2). For example, the intermediate node device in the detection domain collects information according to an indication of detection information in a data packet received from a previous-hop node device of the intermediate node device. After completing the collection, the intermediate node device sends generated reported detection information to the controller. The controller determines performance of the transmission path based on the received reported detection information. Each network device in the detection domain may separately send, to the controller, reported detection information corresponding to each data packet; or may combine reported detection information corresponding to a plurality of data packets, and send combined reported detection information to the controller. For example, after processing detection information 1 corresponding to a data packet 1, the intermediate node device in the detection domain sends, to the controller, reported detection information 1 generated based on the detection information 1; and after processing detection information 2 corresponding to a data packet 2, the intermediate node device sends, to the controller, reported detection information 2 generated based on the detection information 2. Alternatively, after processing detection information 1 corresponding to a data packet 1 and processing detection information 2 corresponding to a data packet 2, the intermediate node device combines reported detection information 1 and reported detection information 2 to generate reported detection information 3, and sends the reported detection information 3 to the controller.

According to the foregoing implementation, the detection information is encapsulated into the data packet on the transmission path, to implement information collection on the data packet on the transmission path, thereby implementing collection on the data packet on the transmission path while ensuring packet forwarding performance.

Figure 3:
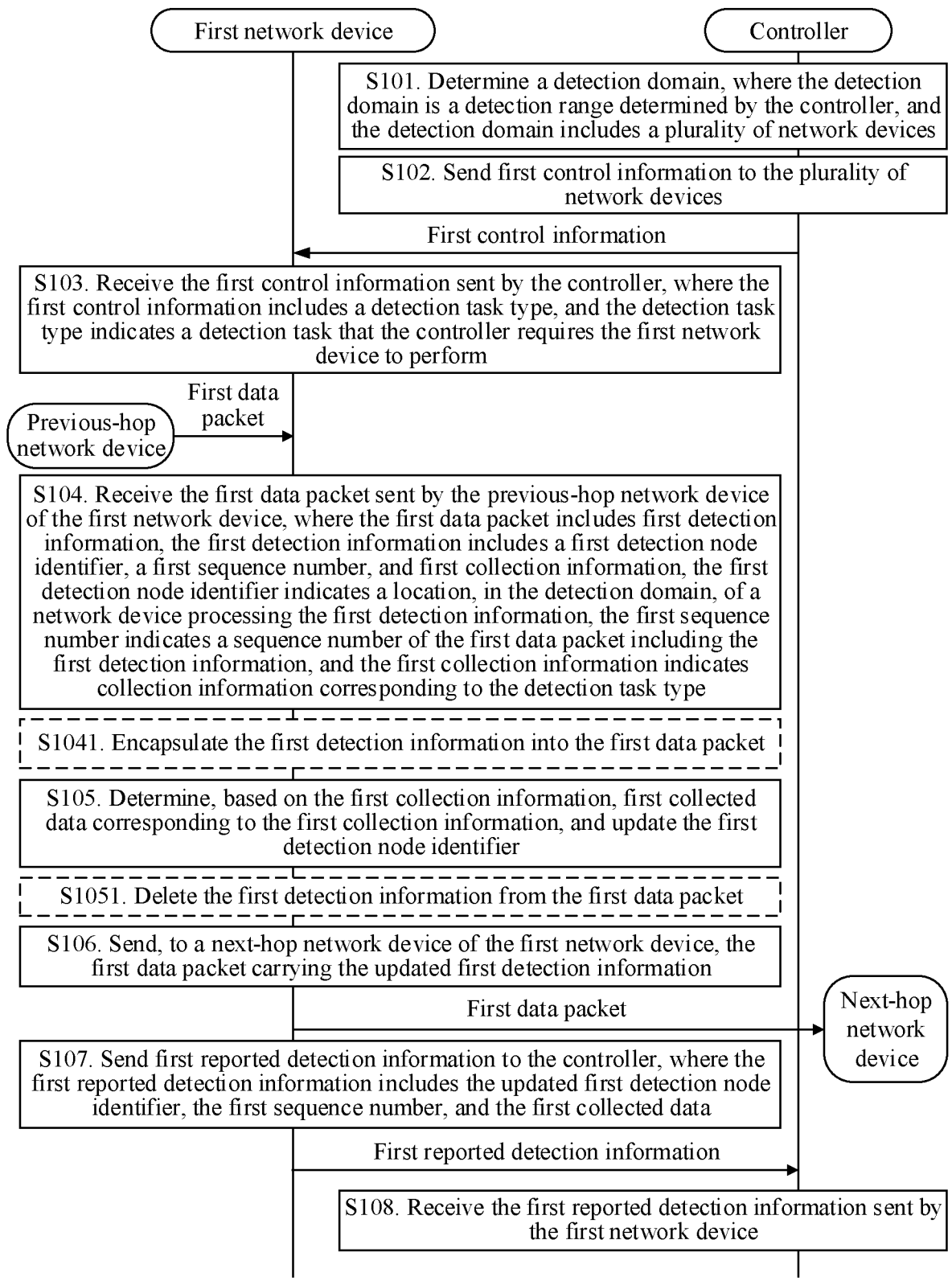
FIG. 3 is a flowchart of a data packet detection method according to an embodiment of this application.

FIG. 3 is a flowchart of a data packet detection method according to an embodiment of this application. Specifically, FIG. 3 is a flowchart of an in-situ flow information telemetry (in-situ flow information telemetry or in-band flow information telemetry) method. The method shown in FIG. 3 may be applied to the network structure shown in FIG. 1 or FIG. 2. The method includes the following steps.

S101. A controller determines a detection domain, where the detection domain is a detection range determined by the controller, and the detection domain includes a plurality of network devices.

According to the foregoing implementation, in a possible implementation, the controller may receive device information of a to-be-detected transmission path that is sent by a network management device or user equipment. The device information includes a head node device identifier and an end node device identifier of the to-be-detected transmission path. For example, a network engineer requires that a transmission path between a first network device and a second network device needs be detected. The network engineer sends a device identifier of the first network device and a device identifier of the second network device to the controller through the network management device or the user equipment. After receiving the device identifier of the first network device and the device identifier of the second network device, the controller uses the first network device as a head node device of the to-be-detected transmission path, and uses the second network device as an end node device of the to-be-detected transmission path, to determine the detection domain. In another possible implementation, based on a topology of the plurality of network devices, the controller uses the first network device as a head node device of the to-be-detected transmission path, and uses the second network device as an end node device of the to-be-detected transmission path. There is at least one intermediate node device on the to-be-detected transmission path between the first network device and the second network device. In still another possible implementation, the controller may determine a head node device of the detection domain based on a source address of a data flow, and determine an end node device of the detection domain based on a destination address of the data flow, so that the controller determines the detection domain.

As shown in FIG. 1, the detection domain determined by the controller includes a head node device, an intermediate node device 1, an intermediate node device 2, and an end node device. As shown in FIG. 2, the detection domain determined by the controller includes a head node device, an intermediate node device 1, an intermediate node device 2, an end node device 1, and an end node device 2.

According to the foregoing implementation, the controller may further determine a flow identifier. The flow identifier is used to identify a data flow. The controller determines, by using the flow identifier, a specific data flow, on the to-be-detected transmission path, on which detection information collection is to be performed. For example, the flow identifier determined by the controller is 01, and the controller detects a data flow 01 when detecting the to-be-detected transmission path.

S102. The controller sends first control information to the plurality of network devices, where the first control information includes a detection task type, and the detection task type indicates a detection task that the controller requires the plurality of network devices to perform.

S103. The first network device receives the first control information sent by the controller.

The controller may send the first control information to the plurality of network devices in the detection domain. The detection task type included in the first control information indicates the detection task that the controller requires the plurality of network devices to perform. For example, the controller sends the first control information to the head node device, the intermediate node device, and the end node device in the detection domain. The detection task type included in the first control information is packet loss detection. In this case, after receiving the first control information sent by the controller, the head node device, the intermediate node device, and the end node device in the detection domain may determine, based on the detection task type, that the to-be-performed detection task is packet loss detection.

Optionally, the first control information may further include the flow identifier. In this case, after receiving the first control information sent by the controller, the head node device, the intermediate node device, and the end node device in the detection domain may perform the corresponding detection task for the data flow indicated by the controller.

When the first network device is the head node device in the detection domain, the controller may send, to the first network device, information carrying a head node identifier. The head node identifier may be represented by using a device identifier, a device IP address, or the like. After receiving the information carrying the head node identifier, the first network device may determine that the first network device is the head node device, so that the first network device may encapsulate detection information into a data packet. In a possible implementation, the controller does not separately send the information carrying the head node identifier; instead, the controller may use, to carry the head node identifier, the control information sent to the first network device that serves as the head node device, to notify the first network device that the first network device is the head node device.

When the first network device is the end node device in the detection domain, the controller may send, to the first network device, information carrying an end node identifier. The end node identifier may be represented by using a device identifier, a device IP address, or the like. After receiving the information carrying the end node identifier, the first network device may determine that the first network device is the end node device, so that the first network device may delete detection information from a data packet. In a possible implementation, the controller does not separately send the information carrying the end node identifier; instead, the controller may use, to carry the end node identifier, the control information sent to the first network device that serves as the end node device, to notify the first network device that the first network device is the end node device.

S104. The first network device receives a first data packet sent by a previous-hop network device of the first network device, where the first data packet includes first detection information, the first detection information includes a first detection node identifier, a first sequence number, and first collection information, the first detection node identifier indicates a location, in the detection domain, of a network device processing the first detection information, the first sequence number indicates a sequence number of the first data packet including the first detection information, the first collection information indicates collection information corresponding to the detection task type, the detection domain is the detection range determined by the controller, the detection domain includes the plurality of network devices, and the plurality of network devices include the first network device.

Figure 4:
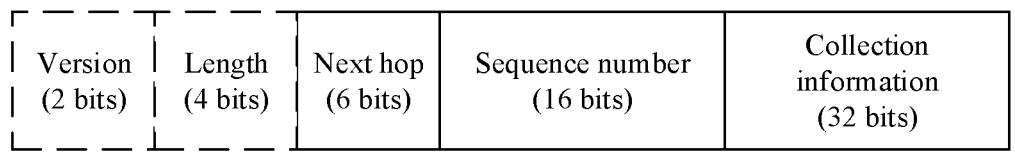
FIG. 4 is a diagram of a detection information format according to an embodiment of this application.

The first detection information includes the first detection node identifier, the first sequence number, and the first collection information. FIG. 4 is a diagram of a detection information format according to an embodiment of this application. Specifically, the first detection node identifier is corresponding to a next hop field in FIG. 4. The first detection node identifier indicates the location, in the detection domain, of the network device processing the first detection information. For example, with reference to FIG. 1, in the head node device, a value of the first detection node identifier (a next hop) is 0; in the intermediate node device 1, the value of the first detection node identifier is updated to 1; in the intermediate node device 2, the value of the first detection node identifier is updated to 2; and in the end node device, the value of the first detection node identifier is updated to 3. To be specific, when the first data packet carrying the first detection information is processed by a network device in the detection domain, the network device increases the value of the first detection node identifier by a step value. For example, the step value is 1. Similarly, a network device in the detection domain in FIG. 2 updates the first detection node identifier by using the same method. It should be noted that if the value of the first detection node identifier is updated to 1 in the intermediate node device 1, the value of the first detection node identifier is updated to 2 in both the intermediate node device 2 and the end node device 2.

The first sequence number is corresponding to a sequence number field in FIG. 4. The first sequence number indicates the sequence number of the first data packet including the first detection information. A value of the first sequence number is determined by the head node device in the detection domain, and an initial value of the first sequence number is determined by the head node device. For example, it is assumed that the data flow 01 includes 1000 data packets in total, and an initial value of the first sequence number that is determined by the head node device is 0. When the head node device receives the first control information sent by the controller and encapsulates the first detection information into a data packet in the data flow 01 based on the first control information, if a data packet located in the head node device is the $100^{th}$ data packet (marked as a data packet 100) in the data flow 01, the head node device sets a value of a sequence number of the data packet 100 to 0, and then sets a value of a sequence number of the $101^{st}$ data packet (marked as a data packet 101) in the data flow 01 to 100.

The first collection information is corresponding to a collection information field in FIG. 4. The first collection information indicates the collection information corresponding to the detection task type. A network device in the detection domain collects corresponding information according to an indication of the first collection information. For example, the detection task type is packet loss detection, and content of the first collection information is a device identifier of the network device. Specifically, a value of the first collection information is 01, and 01 indicates to collect a device identifier of a network device. For example, the intermediate node device in the detection domain collects a device identifier of the intermediate node device according to the indication (requiring to collect a device identifier of a network device) of the first collection information. In this implementation of this application, optionally, the device identifier may be a loopback (loopback) IP address of the network device.

Optionally, the first detection information may further include a length field and a version field. As shown in FIG. 4, the length field indicates a length of the first detection information, so that when processing the first detection information, the network device can locate the first detection information according to an indication of the length field. The version field indicates a version for generating the first detection information, so that the network device in the detection domain can process the first detection information based on a unified version.

Optionally, a length of the version field is 2 bits, a length of the length field is 4 bits, a length of the next hop field is 6 bits, a length of the sequence number field is 16 bits, and a length of the collection information field is 32 bits. In addition, FIG. 4 shows one collection information field. In actual application, the first detection information may include more than one collection information field, so that the network device in the detection domain may simultaneously process a plurality of collection information fields and collect a plurality of pieces of information.

When the first network device is the head node device in the detection domain, the first network device may perform step S1041: The first network device encapsulates the first detection information into the first data packet.

Specifically, after receiving the first control information sent by the controller, the first network device that serves as the head node device performs the detection task indicated by the first control information. In a period in which the first network device performs the detection task, the first network device encapsulates the first detection information into a data packet processed by the first network device. For example, the first data packet is the data packet processed in the period in which the first network device performs the detection task, and the first network device encapsulates the first detection information into the first data packet. In addition, the first network device sets the first detection node identifier, the first sequence number, and the first collection information. For example, the first network device receives a data packet 01 from the previous-hop network device (a network device outside the detection domain that is connected to the first network device) of the first network device, and the data packet 01 is a data packet received at a moment at which the first network device starts to perform the detection task. The first network device encapsulates detection information 01 into the data packet 01. In the detection information 01, a value of a detection node identifier is 0, a value of a sequence number is 0, and a value of collection information is 01 (indicating to collect a device identifier of a network device). After encapsulating the detection information 01 into the data packet 01, the first network device may perform a corresponding collection operation according to subsequent S105. Then the first network device receives a data packet 02 from the previous-hop network device of the first network device, and the data packet 02 is a next data packet of the data packet 01. The first network device encapsulates detection information 02 into the data packet 02. In the detection information 02, a value of a detection node identifier is 0, a value of a sequence number is 1, and a value of collection information is 01. After encapsulating the detection information 02 into the data packet 02, the first network device may perform a corresponding collection operation according to subsequent S105.

Optionally, when encapsulating the first detection information into the first data packet, the first network device that serves as the head node device may determine an encapsulation location of the first detection information based on a type of the data packet. In a possible implementation, the first network device may add a type-length-value (type-length-value, TLV) field to the first data packet, so that the first network device locates the first detection information by using the TLV field. For example, the first data packet is an MPLS packet. The first network device adds a generic associated channel header label (generic associated channel header label, GAL) to the MPLS packet, and the first network device adds the first detection information next to the GAL. For another example, the first data packet is an interne protocol version 6 (Internet Protocol version 6, IPv6) packet, and the IPv6 packet includes a hop by hop (hop by hop, HBH) extension header. The first network device adds a TLV field to the HBH extension header to locate the first detection information.

When the first network device is the intermediate node device in the detection domain, the first network device may receive the first data packet sent by the previous-hop network device of the first network device (assuming that the previous-hop network device of the first network device is the head node device), and the first data packet includes the first detection information. The first network device may perform, based on the first detection information, a collection operation indicated by subsequent S105.

When the first network device is the end node device in the detection domain, the first network device may receive the first data packet sent by the previous-hop network device of the first network device (assuming that the previous-hop network device of the first network device is the intermediate node device), and the first data packet includes the first detection information. The first network device may perform, based on the first detection information, a collection operation indicated by subsequent S105. After completing the collection operation, the first network device may further perform the following operation indicated by S1051: The first network device deletes the first detection information from the first data packet. The first network device transmits, to a next-hop network device outside the detection domain, the first data packet from which the first detection information is deleted. In this way, the network device outside the detection domain can identify the first detection information in the first data packet.

S105. The first network device determines, based on the first collection information, first collected data corresponding to the first collection information, and the first network device updates the first detection node identifier.

S106. The first network device sends, to a next-hop network device of the first network device, the first data packet carrying the updated first detection information.

With reference to the explanations in S104, for example, when the first network device is the head node device in the detection domain, the first network device receives the data packet 01, and encapsulates the detection information 01 into the data packet 01. In the detection information 01, the value of the detection node identifier is 0, the value of the sequence number is 0, and the value of the collection information is 01 (indicating to collect a device identifier of a network device). The first network device collects, according to the indication of the value 01 of the collection information in the detection information 01, the device identifier of the first network device (for example, the device identifier of the head node device is 001), and updates the value of the detection node identifier to 0 (still on the current-hop device). Then the first network device stores collected data obtained after the collection, and a value of the collected data is the device identifier of the first network device. Specifically, the first network device generates, based on the detection information 01, reported detection information 01 corresponding to the detection information 01. The reported detection information 01 includes a detection node identifier with a value of 0, a sequence number with a value of 0, and collected data with a value of 001. The first network device stores the reported detection information 01. After completing processing of the data packet 01, the first network device sends, on an original transmission path of the data packet 01 to the intermediate node device in the detection domain, the data packet 01 carrying the updated detection information 01. Likewise, the first network device performs a same operation on the detection information 02 in the data packet 02.

When the first network device is the intermediate node device in the detection domain, the first network device receives the data packet 01 from the head node device. The data packet 01 includes the detection information 01, and in the detection information 01, the value of the detection node identifier is 0, the value of the sequence number is 0, and the value of the collection information is 01. The first network device collects, according to the indication of the value 01 of the collection information in the detection information 01, the device identifier of the first network device (for example, the device identifier of the intermediate node device is 002), and updates the value of the detection node identifier to 1. Then the first network device stores collected data obtained after the collection, and a value of the collected data is the device identifier of the first network device. Specifically, the first network device generates, based on the detection information 01, reported detection information 01 corresponding to the detection information 01. The reported detection information 01 includes a detection node identifier with a value of 1, a sequence number with a value of 0, and collected data with a value of 002. The first network device stores the reported detection information 01. After completing processing of the data packet 01, the first network device sends, on an original transmission path of the data packet 01 to a next-hop network device (for example, the end node device) of the intermediate node device in the detection domain, the data packet 01 carrying the updated detection information 01. Likewise, the first network device performs a same operation on the detection information 02 in the data packet 02.

When the first network device is the end node device in the detection domain, the first network device receives the data packet 01 from the intermediate node device. The data packet 01 includes the detection information 01, and in the detection information 01, the value of the detection node identifier is 1, the value of the sequence number is 0, and the value of the collection information is 01. The first network device collects, according to the indication of the value 01 of the collection information in the detection information 01, the device identifier of the first network device (for example, the device identifier of the end node device is 003), and updates the value of the detection node identifier to 2. Then the first network device stores collected data obtained after the collection. A value of the collected data is the device identifier of the first network device. Specifically, the first network device generates, based on the detection information 01, reported detection information 01 corresponding to the detection information 01. The reported detection information 01 includes a detection node identifier with a value of 2, a sequence number with a value of 0, and collected data with a value of 003. The first network device stores the reported detection information 01. After completing processing of the data packet 01, the first network device deletes the detection information 01 from the data packet 01, and sends, on an original transmission path of the data packet 01 to a next-hop network device (for example, a network device outside the detection domain that is connected to the end node device) of the end node device in the detection domain, the data packet 01 including no detection information 01. Likewise, the first network device performs a same operation on the detection information 02 in the data packet 02.

Optionally, the first network device and the controller may further perform the following operations S107 and S108.

S107. The first network device sends first reported detection information to the controller, where the first reported detection information includes the updated first detection node identifier, the first sequence number, and the first collected data.

S108. The controller receives the first reported detection information sent by the first network device.

The first network device may send the collected and stored first reported detection information to the controller. Correspondingly, the controller may perform performance detection on the transmission path in the detection domain based on the received first reported detection information. For example, the controller calculates a packet loss rate and performs packet loss locating based on reported detection information collected by each network device in the detection domain. Optionally, the first network device may send, to the controller, collected and stored reported detection information corresponding to each data packet. Alternatively, the first network device may perform, based on the first control information delivered by the controller, selection in collected and stored reported detection information corresponding to each data packet, and then send some reported detection information to the controller. Alternatively, the first network device may combine a plurality of pieces of reported detection information into one piece of reported detection information, and send the combined reported detection information to the controller.

The data packet detection method provided in this embodiment specifically relates to an in-situ flow information telemetry method. The network devices in the detection domain may implement, based on control information delivered by the controller and by using detection information included in a data packet, information collection for a detection task required by the controller, thereby implementing in-situ collection on a data packet on a transmission path and transmission path detection while ensuring packet forwarding performance.

Based on S101 to S106, the following implementation is described by using an example in which the detection task type in the first control information is packet loss detection. Specifically, the detection task type is packet loss detection, the first control information further includes a detection start moment and a detection end moment, the first network device is the head node device in the detection domain, the first data packet is the $1^{st}$ data packet sent, in a time period starting from the detection start moment, by the head node device to the next-hop network device of the head node device, the first collected data includes a device identifier of the head node device, and the method further includes the following steps.

S201. The head node device receives a second data packet sent by a previous-hop network device of the head node device.

S202. The head node device encapsulates second detection information into the second data packet, where the second detection information includes a second detection node identifier, a second sequence number, and second collection information.

S203. The head node device determines, based on the second collection information, second collected data corresponding to the second collection information, and the head node device updates the second detection node identifier, where the second collected data includes the device identifier of the head node device, the second sequence number is greater than the first sequence number, and the second detection node identifier is the same as the first detection node identifier.

S204. The head node device sends, to the next-hop network device of the head node device, the second data packet carrying the updated second detection information, where the second data packet is the last data packet sent by the head node device to the next-hop network device of the head node device before the detection end moment.

S205. The head node device sends first reported detection information and second reported detection information to the controller, where the first reported detection information includes the updated first detection node identifier, the first sequence number, and the first collected data, and the second reported detection information includes the updated second detection node identifier, the second sequence number, and the second collected data.

S206. The controller receives the first reported detection information and the second reported detection information that are sent by the head node device.

According to the foregoing implementation, after the head node device receives the first control information sent by the controller, the head node device may determine, based on the detection task type in the first control information, that a detection task to be performed by the head node device is packet loss detection. In addition, the head node device may further determine the detection start moment and the detection end moment for the packet loss detection based on the first control information. It is assumed that a data packet 01 (corresponding to the first data packet) is the $1^{st}$ data packet sent, in a time period starting from the detection start moment, by the head node device to the next-hop network device of the head node device. The head node device may encapsulate detection information 01 into the data packet 01 according to the foregoing implementation, and obtain reported detection information 01 based on the detection information 01. In the detection information 01, a value of a detection node identifier is 0, a value of a sequence number is 0, and a value of collection information is 01 (indicating to collect a device identifier of a network device). In the reported detection information 01, a value of a detection node identifier is 0, a value of a sequence number is 0, and a value of collected data is 001 (for example, the device identifier of the head node device is 001).

In a time period from the detection start moment to the detection end moment, the head node device processes a plurality of data packets according to the foregoing implementation to obtain and store a plurality of pieces of reported detection information, and sends a plurality of processed data packets to the next-hop network device of the head node device.

The head node device further receives a data packet 101 (corresponding to the foregoing second data packet) sent by the previous-hop network device of the head node device. The data packet 101 is the last data packet sent by the head node device to the next-hop network device of the head node device before the detection end moment. It can be learned that 100 data packets are sent to the next-hop network device of the head node device in the time period from the detection start moment to the detection end moment. The head node device encapsulates detection information 101 into the data packet 101. In the detection information 101, a value of a detection node identifier is 0, a value of a sequence number is 100, and a value of collection information is 01. The head node device determines corresponding reported detection information 101 based on the collection information in the detection information 101, and updates the detection node identifier. In the reported detection information 101, a value of a detection node identifier is 0, a value of a sequence number is 100, and a value of collected data is 001.

After obtaining the reported detection information 01, the head node device stores the reported detection information 01 into a buffer of the head node device. Then the head node device sends, to the next-hop network device of the head node device, the data packet 01 carrying the updated detection information 01. After obtaining the reported detection information 101, the head node device stores the reported detection information 101 into the buffer of the head node device. Then the head node device sends, to the next-hop network device of the head node device, the data packet 101 carrying the updated detection information 101. The head node device further sends the reported detection information 01 and the reported detection information 101 to the controller. The controller receives the reported detection information 01 and the reported detection information 101, so that the controller can perform packet loss detection on the transmission path in the detection domain based on the reported detection information 01 and the reported detection information 101. It should be understood that the head node device may send, to the controller, the reported detection information corresponding to the $1^{st}$ data packet in the detection period and the reported detection information corresponding to the last data packet in the detection period. Alternatively, the head node device may send, to the controller, reported detection information corresponding to all data packets in the detection period.

The following implementation is described based on S101 to S106 and with reference to S201 to S206. Specifically, the first network device is the intermediate node device in the detection domain, the first data packet is a data packet received, in a time period starting from the detection start moment, by the intermediate node device from the head node device, and the first collected data includes a device identifier of the head node device. The method further includes the following steps.

S301. The intermediate node device extends a value of the detection end moment by preset duration, and updates the value of the detection end moment.

S302. The intermediate node device receives, in a time period from the detection start moment to the updated detection end moment, a second data packet sent by a previous-hop network device of the intermediate node device, where the second data packet includes second detection information, and the second detection information includes a second detection node identifier, a second sequence number, and second collection information.

S303. The intermediate node device determines, based on the second collection information, second collected data corresponding to the second collection information, and the intermediate node device updates the second detection node identifier, where the second collected data includes a device identifier of the intermediate node device, the second sequence number is a largest sequence number in sequence numbers of a plurality of data packets that are received by the intermediate node device in the time period, the first data packet is a data packet received by the intermediate node device in the time period, and the first sequence number is a smallest sequence number in the sequence numbers of the plurality of data packets that are received by the intermediate node device in the time period.

S304. The intermediate node device sends, to a next-hop network device of the intermediate node device, the second data packet carrying the updated second detection information.

S305. The intermediate node device generates third reported detection information, where the third reported detection information includes a third detection node identifier, a third sequence number, and third collected data, the third detection node identifier is the same as the updated second detection node identifier, the third collected data includes the device identifier of the intermediate node device, the third sequence number is a sequence number missing from the sequence numbers of the plurality of data packets that are received by the intermediate node device in the time period, and the third sequence number is greater than the first sequence number and less than the second sequence number.

S306. The intermediate node device sends first reported detection information, second reported detection information, and the third reported detection information to the controller, where the first reported detection information includes the updated first detection node identifier, the first sequence number, and the first collected data, and the second reported detection information includes the updated second detection node identifier, the second sequence number, and the second collected data.

S307. The controller receives the first reported detection information, the second reported detection information, and the third reported detection information that are sent by the intermediate node device.

According to the foregoing implementation, after the intermediate node device receives the first control information sent by the controller, the intermediate node device may determine, based on the detection task type in the first control information, that a detection task to be performed by the intermediate node device is packet loss detection. In addition, the intermediate node device may further determine the detection start moment and the detection end moment for the packet loss detection based on the first control information. The intermediate node device extends the value of the detection end moment by the preset duration, and updates the value of the detection end moment. For example, the detection start moment is 10:00 on May 7, 2018, and the detection end moment is 10:02 on May 7, 2018. The intermediate node device updates the detection end moment to 10:05 on May 7, 2018, so that the intermediate node device can receive all data packets that are sent by the head node device in the detection period.

With reference to the descriptions of S201 to S206, the intermediate node device receives a data packet 01 sent by the head node device, determines reported detection information 01 based on detection information 01, and updates a detection node identifier. Therefore, after processing is performed by the intermediate node device, in the detection information 01, a value of a detection node identifier is 1, a value of a sequence number is 0, and a value of collection information is 01; and in the reported detection information 01, a value of a detection node identifier is 1, a value of a sequence number is 0, and a value of collected data is 002 (for example, the device identifier of the intermediate node device is 002). The intermediate node device processes, in the foregoing implementation, a plurality of data packets that are sent by the head node device after the data packet 01. Then the intermediate node device receives a data packet 101 sent by the head node device, determines reported detection information 101 based on detection information 101, and updates a detection node identifier. Therefore, after processing is performed by the intermediate node device, in the detection information 101, a value of a detection node identifier is 1, a value of a sequence number is 100, and a value of collection information is 01; and in the reported detection information 101, a value of a detection node identifier is 1, a value of a sequence number is 100, and a value of collected data is 002 (for example, the device identifier of the intermediate node device is 002).

After obtaining the reported detection information 01, the intermediate node device stores the reported detection information 01 into a buffer of the intermediate node device. Then the intermediate node device sends, to the next-hop network device of the intermediate node device, the data packet 01 carrying the updated detection information 01. After obtaining the reported detection information 101, the intermediate node device stores the reported detection information 101 into the buffer of the intermediate node device. Then the intermediate node device sends, to the next-hop network device of the intermediate node device, the data packet 101 carrying the updated detection information 101. In addition, after the detection period ends, the intermediate node device may determine that the sequence number included in the reported detection information 01 is the smallest sequence number in the sequence numbers of the plurality of data packets that are received by the intermediate node device in the time period, and the sequence number in the reported detection information 101 is the largest sequence number in the sequence numbers of the plurality of data packets that are received by the intermediate node device in the time period.

It is assumed that a data packet 51 with a sequence number of 50 is lost. In other words, the intermediate node device cannot receive the data packet 51 sent by the head node device. The intermediate node device may determine, based on the data packet with the smallest sequence number and the data packet with the largest sequence number that are received from the head node device, and a data packet corresponding to a sequence number between the smallest sequence number and the largest sequence number, that the data packet 51 with the sequence number of 50 is not received. The intermediate node device generates reported detection information 51. In the reported detection information 51, a value of a detection node identifier is 1, a value of a sequence number is 50, and a value of collected data is 002. The intermediate node device stores the reported detection information 51.

The intermediate node device further sends, to the controller, the reported detection information 01, the reported detection information 101, and the reported detection information 51 corresponding to the data packet 51 that is not received. The controller may determine, based on the reported detection information sent by the head node device, a total quantity of data packets that are sent by the head node device. The controller may determine, based on the reported detection information sent by the intermediate node device, a quantity of packets lost on a transmission path from the head node device to the intermediate node device (for example, determine, by using the foregoing method, that a data packet 21, a data packet 45, and the data packet 51 are lost). In this way, the controller can determine a packet loss rate of the transmission path from the head node device to the intermediate node device.

The foregoing implementation is described by using the intermediate node device as an example. Actually, S301 to S307 may also be applied to an end node device. Further, according to the foregoing implementation, the end node device may further delete detection information from a data packet, and restore the data packet to a data packet carrying no detection information.

In the description of the foregoing implementation, an example in which the data packet with the smallest sequence number and the data packet with the largest sequence number that are received by the intermediate node device are the $1^{st}$ data packet (the first data packet) and the last data packet (the second data packet) that are sent by the head node device in the detection period is used for description. In actual application, a packet loss may occur in a transmission process, or a network device in the detection domain sends data packets to two network devices (for example, the end node device 2 and the intermediate node device 2 in FIG. 2) through load sharing. Therefore, each network device in the detection domain needs to determine only reported detection information corresponding to a data packet with a smallest sequence number and reported detection information corresponding to a data packet with a largest sequence number in a detection period, and then the network device determines reported detection information corresponding to a lost data packet between the data packet with the smallest sequence number and the data packet with the largest sequence number.

In a possible implementation, a network device in the detection domain may combine a plurality of pieces of reported detection information, and report combined reported detection information to the controller. For example, in S306, the intermediate node device generates fourth reported detection information based on the first reported detection information, the second reported detection information, and the third reported detection information. The fourth reported detection information includes a detection node identifier (a location of the intermediate node device in the detection domain), the device identifier of the intermediate node device, the sequence number included in the first reported detection information, the sequence number included in the second reported detection information, and the sequence number included in the third reported detection information.

The controller may further determine, based on reported detection information received from each network device in the detection domain, a packet loss location, in the detection domain, at which a data packet is lost. For example, as shown in FIG. 1, the controller may determine, based on reported detection information reported by the end node device, that a data packet corresponding to a fifth sequence number whose value is 50 is lost. The controller searches, based on the value of the fifth sequence number, reported detection information reported by the intermediate node device 1 and the intermediate node device 2 for reported detection information that includes the fifth sequence number and in which a detection node identifier has a smallest value. It is assumed that, the controller determines that fifth reported detection information from the intermediate node device 1 includes the fifth sequence number, and a value of a fifth detection node identifier included in the fifth reported detection information is smallest. The controller determines a packet loss locating node based on fifth collected data (a device identifier of the intermediate node device 1) included in the fifth reported detection information.

In the foregoing implementation, the network device in the detection domain does not report, to the controller, reported detection information of all data packets in the detection period, but reports the reported detection information with the smallest sequence number, the reported detection information with the largest sequence number, and the reported detection information corresponding to the lost data packet. In actual application, the network device in the detection domain may report the reported detection information of all the data packets in the detection period to the controller. In this way, the controller can directly calculate a packet loss rate and perform packet loss locating based on reported detection information reported by each node, without a need for preprocessing performed by each network node. In the implementation in which the network device in the detection domain reports all the reported detection information, when the controller performs packet loss locating, the controller first determines a lost sequence number, and then searches the collected reported detection information for reported detection information (for example, sixth reported detection information) that includes the lost sequence number and in which a detection node identifier has a largest value. The controller determines a packet loss locating node based on sixth collected data included in the sixth reported detection information.

Figure 5:
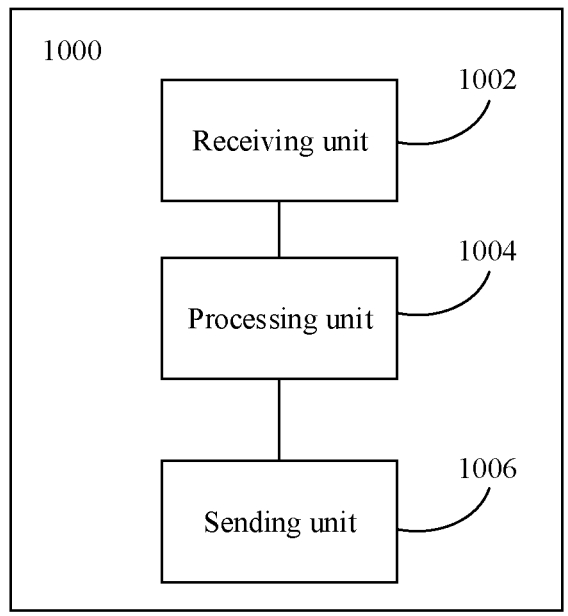
FIG. 5 is a schematic structural diagram of a first network device according to an embodiment of this application.

FIG. 5 is a schematic structural diagram of a first network device 1000 according to an embodiment of this application. The first network device 1000 shown in FIG. 5 may perform corresponding steps performed by the first network device in the methods in the foregoing embodiments. As shown in FIG. 5, the first network device 1000 includes a receiving unit 1002, a processing unit 1004, and a sending unit 1006.

The receiving unit 1002 is configured to receive first control information sent by a controller, where the first control information includes a detection task type, and the detection task type indicates a detection task that the controller requires the first network device to perform.

The receiver 1002 is further configured to receive a first data packet sent by a previous-hop network device of the first network device, where the first data packet includes first detection information, the first detection information includes a first detection node identifier, a first sequence number, and first collection information, the first detection node identifier indicates a location, in a detection domain, of a network device processing the first detection information, the first sequence number indicates a sequence number of the first data packet including the first detection information, the first collection information indicates collection information corresponding to the detection task type, the detection domain is a detection range determined by the controller, the detection domain includes a plurality of network devices, and the plurality of network devices include the first network device.

The processing unit 1004 is configured to determine, based on the first collection information, first collected data corresponding to the first collection information, and the processing unit 1004 is further configured to update the first detection node identifier.

The sending unit 1006 is configured to send, to a next-hop network device of the first network device, the first data packet carrying the updated first detection information.

Optionally, the processing unit 1004 is further configured to encapsulate the first detection information into the first data packet after the receiving unit 1002 receives the first data packet sent by the previous-hop network device of the first network device.

Optionally, the processing unit 1004 is further configured to delete the first detection information from the first data packet before the sending unit 1006 sends the first data packet to the next-hop network device of the first network device.

Optionally, the sending unit 1006 is further configured to send first reported detection information to the controller, where the first reported detection information includes the updated first detection node identifier, the first sequence number, and the first collected data.

Optionally, the detection task type is packet loss detection, the first control information further includes a detection start moment and a detection end moment, the first network device is a head node device in the detection domain, the first data packet is the $1^{st}$ data packet sent, in a time period starting from the detection start moment, by the sending unit 1006 to the next-hop network device of the first network device, and the first collected data includes a device identifier of the first network device. The receiving unit 1002 is further configured to receive a second data packet sent by the previous-hop network device of the first network device. The processing unit 1004 is further configured to encapsulate second detection information into the second data packet, where the second detection information includes a second detection node identifier, a second sequence number, and second collection information. The processing unit 1004 is further configured to determine, based on the second collection information, second collected data corresponding to the second collection information, and the processing unit 1004 is further configured to update the second detection node identifier, where the second collected data includes the device identifier of the first network device, the second sequence number is greater than the first sequence number, and the second detection node identifier is the same as the first detection node identifier. The sending unit 1006 is further configured to send, to the next-hop network device of the first network device, the second data packet carrying the updated second detection information, where the second data packet is the last data packet sent by the sending unit 1006 to the next-hop network device of the first network device before the detection end moment. The sending unit 1006 is further configured to send first reported detection information and second reported detection information to the controller, where the first reported detection information includes the updated first detection node identifier, the first sequence number, and the first collected data, and the second reported detection information includes the updated second detection node identifier, the second sequence number, and the second collected data.

Optionally, the detection task type is packet loss detection, the first control information further includes a detection start moment and a detection end moment, the first network device is an intermediate node device or an end node device in the detection domain, and the first collected data includes a device identifier of the first network device. The processing unit 1004 is further configured to extend a value of the detection end moment by preset duration, and update the value of the detection end moment. The receiving unit 1002 is further configured to receive, in a time period from the detection start moment to the updated detection end moment, a second data packet sent by the previous-hop network device of the first network device, where the second data packet includes second detection information, and the second detection information includes a second detection node identifier, a second sequence number, and second collection information. The processing unit 1004 is further configured to determine, based on the second collection information, second collected data corresponding to the second collection information, and the processing unit 1004 is further configured to update the second detection node identifier, where the second collected data includes the device identifier of the first network device, the second sequence number is a largest sequence number in sequence numbers of a plurality of data packets that are received by the receiving unit 1002 in the time period, the first data packet is a data packet received by the receiving unit 1002 in the time period, and the first sequence number is a smallest sequence number in the sequence numbers of the plurality of data packets that are received by the receiving unit 1002 in the time period. The sending unit 1006 is further configured to send, to the next-hop network device of the first network device, the second data packet carrying the updated second detection information. The processing unit 1004 is further configured to generate third reported detection information, where the third reported detection information includes a third detection node identifier, a third sequence number, and third collected data, the third detection node identifier is the same as the updated second detection node identifier, the third collected data includes the device identifier of the first network device, the third sequence number is a sequence number missing from the sequence numbers of the plurality of data packets that are received by the receiving unit 1002 in the time period, and the third sequence number is greater than the first sequence number and less than the second sequence number. The sending unit 1006 is further configured to send first reported detection information, second reported detection information, and the third reported detection information to the controller, where the first reported detection information includes the updated first detection node identifier, the first sequence number, and the first collected data, and the second reported detection information includes the updated second detection node identifier, the second sequence number, and the second collected data.

The first network device shown in FIG. 5 may perform the corresponding steps performed by the first network device in the methods in the foregoing embodiments. Network devices in the detection domain may implement, based on control information delivered by the controller and by using detection information included in a data packet, information collection for a detection task required by the controller, thereby implementing in-situ collection on a data packet on a transmission path and transmission path detection while ensuring packet forwarding performance.

Figure 6:
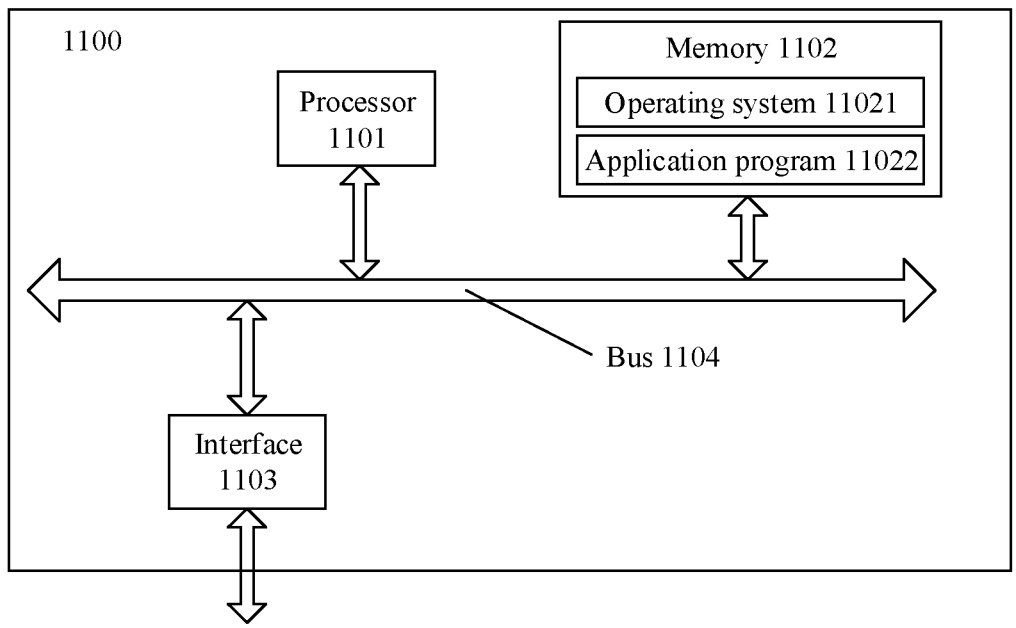
FIG. 6 is a schematic diagram of a hardware structure of a first network device according to an embodiment of this application.

FIG. 6 is a schematic diagram of a hardware structure of a first network device 1100 according to an embodiment of this application. The first network device 1100 shown in FIG. 6 may perform corresponding steps performed by the first network device in the methods in the foregoing embodiments.

As shown in FIG. 6, the first network device 1100 includes a processor 1101, a memory 1102, an interface 1103, and a bus 1104. The interface 1103 may be implemented in a wireless or wired manner, and may be specifically a network adapter. The processor 1101, the memory 1102, and the interface 1103 are connected through the bus 1104.

The interface 1103 may specifically include a transmitter and a receiver, configured to send and receive information between the first network device and the previous-hop network device or the next-hop network device of the first network device in the foregoing embodiments, and/or configured to send and receive information between the first network device and the controller in the foregoing embodiments. For example, the interface 1103 is configured to support receiving of first control information sent by the controller, configured to receive a first data packet sent by the previous-hop network device of the first network device, and/or configured to send, to the next-hop network device of the first network device, the first data packet carrying updated first detection information. For example, the interface 1103 is configured to support the procedures S103, S104, and S106 in FIG. 3. The processor 1101 is configured to perform processing performed by the first network device in the foregoing embodiments. For example, the processor 1101 is configured to determine first collected data corresponding to first collection information, configured to update a first detection node identifier, and/or configured to perform other procedures in the technology described in this specification. For example, the processor 1101 is configured to support the procedure S105 in FIG. 3. The memory 1102 includes an operating system 11021 and an application program 11022, and is configured to store a program, code, or an instruction. When executing the program, code, or instruction, the processor or a hardware device may complete a processing process of the first network device in the method embodiments. Optionally, the memory 1102 may include a read-only memory (English: Read-only Memory, ROM for short) and a random access memory (English: Random Access Memory, RAM for short). The ROM includes a basic input/output system (English: Basic Input/Output System, BIOS for short) or an embedded system, and the RAM includes the application program and the operating system. When the first network device 1100 needs to run, a bootloader in the BIOS or the embedded system that is built into the ROM is used to boot a system to start, and boot the first network device 1100 to enter a normal running state. After entering the normal running state, the first network device 1100 runs the application program and the operating system in the RAM, to complete the processing process of the first network device in the method embodiments.

It may be understood that FIG. 6 shows merely a simplified design of the first network device 1100. In actual application, the first network device may include any quantity of interfaces, processors, or memories.

Figure 7:
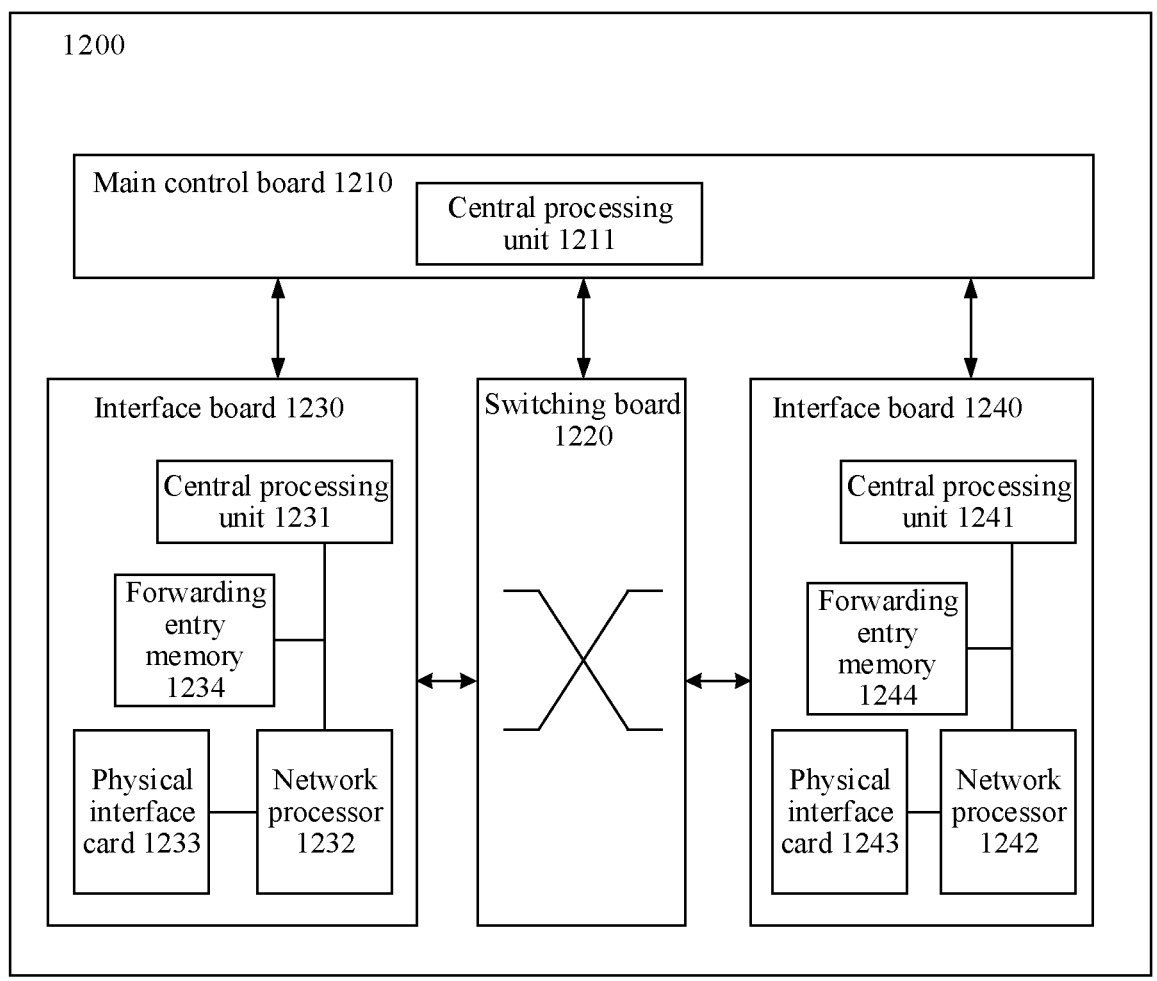
FIG. 7 is a schematic diagram of a hardware structure of another first network device according to an embodiment of this application.

FIG. 7 is a schematic diagram of a hardware structure of another first network device 1200 according to an embodiment of this application. The first network device 1200 shown in FIG. 7 may perform corresponding steps performed by the first network device in the methods in the foregoing embodiments.

As shown in FIG. 7, the first network device 1200 includes a main control board 1210, an interface board 1230, a switching board 1220, and an interface board 1240. The main control board 1210, the interface boards 1230 and 1240, and the switching board 1220 are connected to a system backboard through a system bus for communication. The main control board 1210 is configured to complete functions such as system management, device maintenance, and protocol processing. The switching board 1220 is configured to complete data exchange between interface boards (an interface board is alternatively referred to as a line card or a service board). The interface boards 1230 and 1240 are configured to provide various service interfaces (for example, a POS interface, a GE interface, and an ATM interface), and forward a data packet.

The interface board 1230 may include a central processing unit 1231, a forwarding entry memory 1234, a physical interface card 1233, and a network processor 1232. The central processing unit 1231 is configured to control and manage the interface board, and communicate with a central processing unit on the main control board. The forwarding entry memory 1234 is configured to store a forwarding entry. The physical interface card 1233 is configured to receive and send traffic. The network processor 1232 is configured to control, based on the forwarding entry, the physical interface card 1233 to receive and send traffic.

Specifically, the physical interface card 1233 is configured to receive a data packet sent by a previous-hop network device of the first network device, configured to send a data packet to a next-hop network device of the first network device, and/or configured to exchange information with a controller.

After receiving the data packet, the physical interface card 1233 sends the data packet to a central processing unit 1211 through the central processing unit 1231, and the central processing unit 1211 processes the data packet.

The central processing unit 1211 is configured to determine first collected data corresponding to first collection information.

The central processing unit 1211 is further configured to update a first detection node identifier.

The central processing unit 1231 is further configured to control the network processor 1232 to obtain the forwarding entry in the forwarding entry memory 1234, and the central processing unit 1231 is further configured to control the network processor 1232 to send and receive traffic through the physical interface card 1233.

It should be understood that operations on the interface board 1240 are consistent with the operations on the interface board 1230 in this embodiment of the present application. For brevity, details are not described again. It should be understood that the first network device 1200 in this embodiment may be corresponding to the functions and/or the various implemented steps in the method embodiments. Details are not described herein again.

In addition, it should be noted that there may be one or more main control boards. When there are a plurality of main control boards, a primary main control board and a secondary main control board may be included. There may be one or more interface boards, and the first network device having a stronger data processing capability provides more interface boards. There may also be one or more physical interface cards on the interface board. There may be no switching board, or one or more switching boards. When there are a plurality of switching boards, load sharing and redundancy backup may be implemented together. In a centralized forwarding architecture, the first network device may need no switching board, and the interface board provides a function of processing service data in an entire system. In a distributed forwarding architecture, the first network device may have at least one switching board, and exchange data between a plurality of interface boards through the switching board, to provide a large-capacity data exchange and processing capability. Therefore, a data access and processing capability of the first network device in the distributed architecture is better than a data access and processing capability of the first network device in the centralized architecture. Which architecture is specifically used depends on a specific networking deployment scenario, and is not limited herein.

In addition, an embodiment of this application provides a computer storage medium, configured to store a computer software instruction used by the foregoing first network device. The computer software instruction includes a program designed to perform the method embodiments.

Figure 8:
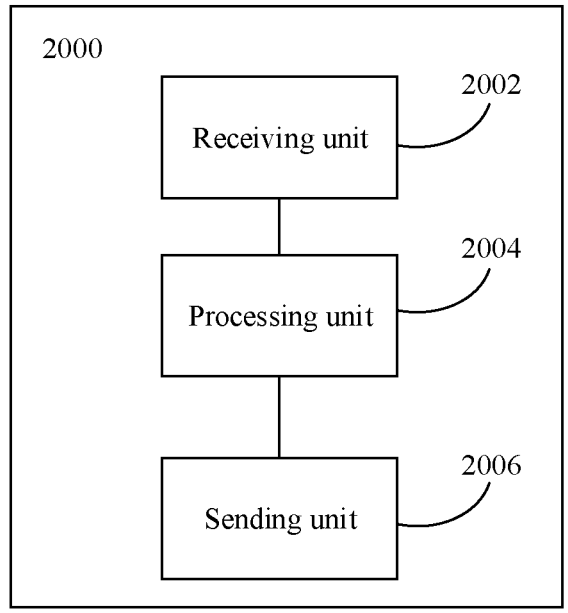
FIG. 8 is a schematic structural diagram of a controller according to an embodiment of this application.

FIG. 8 is a schematic structural diagram of a controller 2000 according to an embodiment of this application. The controller 2000 shown in FIG. 8 may perform corresponding steps performed by the controller in the methods in the foregoing embodiments. As shown in FIG. 8, the controller 2000 includes a receiving unit 2002, a processing unit 2004, and a sending unit 2006.

The processing unit 2004 is configured to determine a detection domain, where the detection domain is a detection range determined by the processing unit 2004, and the detection domain includes a plurality of network devices.

The sending unit 2006 is configured to send first control information to the plurality of network devices, where the first control information includes a detection task type, and the detection task type indicates a detection task that the controller requires the plurality of network devices to perform.

The receiving unit 2002 is configured to receive first reported detection information sent by a first network device, where the first reported detection information is determined by the first network device based on first detection information, the first detection information is detection information obtained by the first network device from a first data packet before the first network device sends the first data packet to a next-hop network device of the first network device, the first reported detection information includes a first detection node identifier, a first sequence number, and first collected data, the first detection node identifier indicates a location, in the detection domain, of a network device processing the first detection information, the first sequence number indicates a sequence number of the first data packet including the first detection information, the first collected data is collected data, corresponding to first collection information, that is determined by the first network device based on the first collection information in the first detection information, the first collection information indicates collection information corresponding to the detection task type, and the plurality of network devices include the first network device.

Optionally, the detection task type is packet loss detection, the first control information further includes a detection start moment and a detection end moment, the first network device is a head node device in the detection domain, the first data packet is the $1^{st}$ data packet sent, in a time period starting from the detection start moment, by the first network device to the next-hop network device of the first network device, and the first collected data includes a device identifier of the first network device. The receiving unit 2002 is further configured to receive second reported detection information sent by the first network device, where the second reported detection information is determined by the first network device based on second detection information, the second detection information is detection information obtained by the first network device from a second data packet before the first network device sends the second data packet to the next-hop network device of the first network device, the second reported detection information includes a second detection node identifier, a second sequence number, and second collected data, the second collected data includes the device identifier of the first network device, the second sequence number is greater than the first sequence number, the second detection node identifier is the same as the first detection node identifier, and the second data packet is the last data packet sent by the first network device to the next-hop network device of the first network device before the detection end moment.

Optionally, the receiving unit 2002 is further configured to receive third reported detection information sent by a second network device, where the third reported detection information includes a third detection node identifier and third collected data, the third detection node identifier indicates a location of the second network device in the detection domain, the third collected data includes a device identifier of the second network device, the third reported detection information further includes a third sequence number, a fourth sequence number, and a fifth sequence number, the third sequence number is a smallest sequence number in sequence numbers of a plurality of data packets received by the second network device in a time period from the detection start moment to a moment obtained by extending the detection end moment by preset duration, the fourth sequence number is a sequence number missing from the sequence numbers of the plurality of data packets received by the second network device in the time period, the fifth sequence number is a largest sequence number in the sequence numbers of the plurality of data packets received by the second network device in the time period, the second network device is an intermediate node device or an end node device in the detection domain, and the plurality of network devices include the second network device.

Optionally, the processing unit 2004 is further configured to determine a packet loss rate based on the first reported detection information, the second reported detection information, and the third reported detection information.

Optionally, the processing unit 2004 is further configured to determine fourth reported detection information based on the fourth sequence number, where a value of a fourth detection node identifier included in the fourth reported detection information is smallest in all reported detection information, including the fourth sequence number, that is received by the receiving unit 2002. The processing unit 2004 is further configured to determine a packet loss locating node based on fourth collected data included in the fourth reported detection information.

The controller shown in FIG. 8 may perform the corresponding steps performed by the controller in the methods in the foregoing embodiments. Network devices in the detection domain may implement, based on control information delivered by the controller and by using detection information included in a data packet, information collection and reporting for a detection task required by the controller, thereby implementing in-situ collection on a data packet on a transmission path and transmission path detection while ensuring packet forwarding performance.

Figure 9:
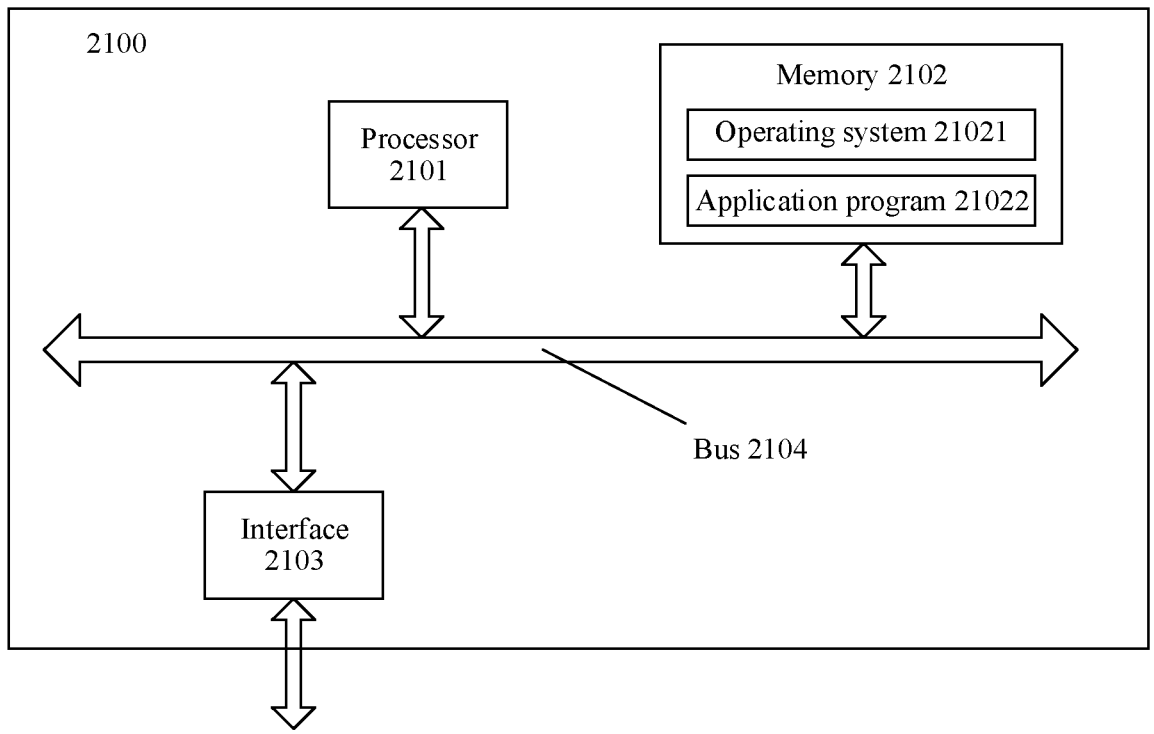
FIG. 9 is a schematic diagram of a hardware structure of a controller according to an embodiment of this application.

FIG. 9 is a schematic diagram of a hardware structure of a controller 2100 according to an embodiment of this application. The controller 2100 shown in FIG. 9 may perform corresponding steps performed by the controller in the methods in the foregoing embodiments.

As shown in FIG. 9, the controller 2100 includes a processor 2101, a memory 2102, an interface 2103, and a bus 2104. The interface 2103 may be implemented in a wireless or wired manner, and may be specifically a network adapter. The processor 2101, the memory 2102, and the interface 2103 are connected through the bus 2104.

The interface 2103 may specifically include a transmitter and a receiver, and is configured to send and receive information between the controller and the first network device in the foregoing embodiments. For example, the interface 2103 is configured to support sending of control information to the first network device, and/or configured to receive reported detection information sent by the first network device. For example, the interface 2103 is configured to support the procedures S102 and S108 in FIG. 3. The processor 2101 is configured to perform processing performed by the controller in the foregoing embodiments. For example, the processor 2101 is configured to determine a detection domain, and/or configured to perform other procedures in the technology described in this specification. For example, the processor 2101 is configured to support the procedure S101 in FIG. 3. The memory 2102 includes an operating system 21021 and an application program 21022, and is configured to store a program, code, or an instruction. When executing the program, code, or instruction, the processor or a hardware device may complete a processing process of the controller in the method embodiments. Optionally, the memory 2102 may include a read-only memory (English: Read-only Memory, ROM for short) and a random access memory (English: Random Access Memory, RAM for short). The ROM includes a basic input/output system (English: Basic Input/Output System, BIOS for short) or an embedded system, and the RAM includes the application program and the operating system. When the controller 2100 needs to run, a bootloader in the BIOS or the embedded system that is built into the ROM is used to boot a system to start, and boot the controller 2100 to enter a normal running state. After entering the normal running state, the controller 2100 runs the application program and the operating system in the RAM, to complete the processing process of the controller in the method embodiments.

It may be understood that FIG. 9 shows merely a simplified design of the controller 2100. In actual application, the controller may include any quantity of interfaces, processors, or memories.

In addition, an embodiment of this application provides a computer storage medium, configured to store a computer software instruction used by the foregoing controller. The computer software instruction includes a program designed to perform the method embodiments.

In the implementation of FIG. 5, FIG. 6, FIG. 7, FIG. 8, or FIG. 9, optionally, the first detection information further includes a flow identifier. The flow identifier indicates a data flow to which the first data packet belongs.

In the implementation of FIG. 5, FIG. 6, FIG. 7, FIG. 8, or FIG. 9, optionally, the first detection information further includes a first length and a first version number. The first length indicates a length of the first detection information, and the first version number indicates a protocol version of the first detection information.

An embodiment of this application further includes a network system, and the network system includes a first network device and a controller. The first network device is the first network device in FIG. 5, FIG. 6, or FIG. 7, and the controller is the controller in FIG. 8 or FIG. 9.

Method or algorithm steps described in combination with the content disclosed in this application may be implemented by hardware, or may be implemented by a processor by executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form well-known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in user equipment. Certainly, the processor and the storage medium may exist in the user equipment as discrete components.

A person skilled in the art should be aware that in one or more of the foregoing examples, the functions described in this application may be implemented by hardware or a combination of hardware and software. When the functions are implemented by the combination of hardware and software, the software may be stored in a computer readable medium or transmitted as one or more instructions or one or more pieces of code in the computer readable medium. The computer readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application.

What is claimed is:

1. A data packet processing method by a first network device, wherein the method comprises:
    receiving first control information, sent by a controller, that comprises a detection task type which indicates a detection task that the controller requires the first network device to perform;
    receiving a first data packet sent by a previous-hop network device relative to the first network device, wherein the first data packet comprises first detection information that includes a first detection node identifier, a first sequence number, and first collection information, the first detection node identifier indicates a location, in a detection domain, of a network device processing the first detection information, the first sequence number indicates a sequence number of the first data packet comprising the first detection information, the first collection information indicates collection information corresponding to the detection task type, the detection domain is a detection range determined by the controller, the detection domain comprises a plurality of network devices, and the plurality of network devices comprise the first network device;
    determining, based on the first collection information, first collected data corresponding to the first collection information, and updating, by the first network device, the first detection node identifier; and
    sending, to a next-hop network device of the first network device, the first data packet carrying the updated first detection information.

2. The method according to claim 1, wherein the first network device is a head node device in the detection domain, and after the receiving, by the first network device, a first data packet sent by a previous-hop network device of the first network device, the method further comprises:
    encapsulating, by the first network device, the first detection information into the first data packet.

3. The method according to claim 1, wherein the first network device is an end node device in the detection domain, and before the sending, by the first network device to a next-hop network device of the first network device, the first data packet carrying the updated first detection information, the method further comprises:
    deleting, by the first network device, the first detection information from the first data packet.

4. The method according to claim 1, wherein the method further comprises:

sending, by the first network device, first reported detection information to the controller, wherein the first reported detection information comprises the updated first detection node identifier, the first sequence number, and the first collected data.

5. The method according to claim 1, wherein the detection task type is packet loss detection, the first control information further comprises a detection start moment and a detection end moment, the first network device is the head node device in the detection domain, the first data packet is the $1^{st}$ data packet sent, in a time period starting from the detection start moment, by the first network device to the next-hop network device of the first network device, the first collected data comprises a device identifier of the first network device, and the method further comprises:

receiving, by the first network device, a second data packet sent by the previous-hop network device of the first network device;

encapsulating, by the first network device, second detection information into the second data packet, wherein the second detection information comprises a second detection node identifier, a second sequence number, and second collection information;

determining, by the first network device based on the second collection information, second collected data corresponding to the second collection information, and updating, by the first network device, the second detection node identifier, wherein the second collected data comprises the device identifier of the first network device, the second sequence number is greater than the first sequence number, and the second detection node identifier is the same as the first detection node identifier;

sending, by the first network device to the next-hop network device of the first network device, the second data packet carrying the updated second detection information, wherein the second data packet is the last data packet sent by the first network device to the next-hop network device of the first network device before the detection end moment; and sending, by the first network device, first reported detection information and second reported detection information to the controller, wherein the first reported detection information comprises the updated first detection node identifier, the first sequence number, and the first collected data, and the second reported detection information comprises the updated second detection node identifier, the second sequence number, and the second collected data.

6. The method according to claim 1, wherein the detection task type is packet loss detection, the first control information further comprises a detection start moment and a detection end moment, the first network device is an intermediate node device or an end node device in the detection domain, the first collected data comprises a device identifier of the first network device, and the method further comprises:

extending, by the first network device, a value of the detection end moment by preset duration, and updating the value of the detection end moment;

receiving, by the first network device in a time period from the detection start moment to the updated detection end moment, a second data packet sent by the previous-hop network device of the first network device, wherein the second data packet comprises second detection information, and the second detection information comprises a second detection node identifier, a second sequence number, and second collection information;

determining, by the first network device based on the second collection information, second collected data corresponding to the second collection information, and updating, by the first network device, the second detection node identifier, wherein the second collected data comprises the device identifier of the first network device, the second sequence number is a largest sequence number in sequence numbers of a plurality of data packets that are received by the first network device in the time period, the first data packet is a data packet received by the first network device in the time period, and the first sequence number is a smallest sequence number in the sequence numbers of the plurality of data packets that are received by the first network device in the time period;

sending, by the first network device to the next-hop network device of the first network device, the second data packet carrying the updated second detection information;

generating, by the first network device, third reported detection information, wherein the third reported detection information comprises a third detection node identifier, a third sequence number, and third collected data, the third detection node identifier is the same as the updated second detection node identifier, the third collected data comprises the device identifier of the first network device, the third sequence number is a sequence number missing from the sequence numbers of the plurality of data packets that are received by the first network device in the time period, and the third sequence number is greater than the first sequence number and less than the second sequence number; and sending, by the first network device, first reported detection information, second reported detection information, and the third reported detection information to the controller, wherein the first reported detection information comprises the updated first detection node identifier, the first sequence number, and the first collected data, and the second reported detection information comprises the updated second detection node identifier, the second sequence number, and the second collected data.

7. The method according to claim 1, wherein the first detection information further comprises a flow identifier, and the flow identifier indicates a data flow to which the first data packet belongs.

8. The method according to claim 1, wherein the first detection information further comprises a first length and a first version number, the first length indicates a length of the first detection information, and the first version number indicates a protocol version of the first detection information.

9. A data packet processing method by a controller, comprising:

determining a detection range for a detection domain that comprises a plurality of network devices;

sending first control information to the plurality of network devices that includes a detection task type which indicates a detection task that the controller requires the plurality of network devices to perform; and receiving first reported detection information sent by a first network device, wherein the first reported detection information is determined by the first network device based on first detection information, the first detection information is detection information obtained by the first network device from a first data packet before the first network device sends the first data packet to a next-hop network device of the first network device, the first reported detection information comprises a first detection node identifier, a first sequence number, and first collected data, the first detection node identifier indicates a location, in the detection domain, of a network device processing the first detection information, the first sequence number indicates a sequence number of the first data packet comprising the first detection information, the first collected data is collected data, corresponding to first collection information, that is determined by the first network device based on the first collection information in the first detection information, the first collection information indicates collection information corresponding to the detection task type, and the plurality of network devices comprise the first network device.

10. The method according to claim 9, wherein the detection task type is packet loss detection, the first control information further comprises a detection start moment and a detection end moment, the first network device is a head node device in the detection domain, the first data packet is the $1^{st}$ data packet sent, in a time period starting from the detection start moment, by the first network device to the next-hop network device of the first network device, the first collected data comprises a device identifier of the first network device, and the method further comprises:

receiving, by the controller, second reported detection information sent by the first network device, wherein the second reported detection information is determined by the first network device based on second detection information, the second detection information is detection information obtained by the first network device from a second data packet before the first network device sends the second data packet to the next-hop network device of the first network device, the second reported detection information comprises a second detection node identifier, a second sequence number, and second collected data, the second collected data comprises the device identifier of the first network device, the second sequence number is greater than the first sequence number, the second detection node identifier is the same as the first detection node identifier, and the second data packet is the last data packet sent by the first network device to the next-hop network device of the first network device before the detection end moment.

11. The method according to claim 10, wherein the method further comprises:

receiving, by the controller, third reported detection information sent by a second network device, wherein the third reported detection information comprises a third detection node identifier and third collected data, the third detection node identifier indicates a location of the second network device in the detection domain, the third collected data comprises a device identifier of the second network device, the third reported detection information further comprises a third sequence number, a fourth sequence number, and a fifth sequence number, the third sequence number is a smallest sequence number in sequence numbers of a plurality of data packets received by the second network device in a time period from the detection start moment to a moment obtained by extending the detection end moment by preset duration, the fourth sequence number is a sequence number missing from the sequence numbers of the plurality of data packets received by the second network device in the time period, the fifth sequence number is a largest sequence number in the sequence numbers of the plurality of data packets received by the second network device in the time period, the second network device is an intermediate node device or an end node device in the detection domain, and the plurality of network devices comprise the second network device.

12. The method according to claim 11, wherein the method further comprises:

determining, by the controller, a packet loss rate based on the first reported detection information, the second reported detection information, and the third reported detection information.

13. The method according to claim 11, wherein the method further comprises:

determining, by the controller, fourth reported detection information based on the fourth sequence number, wherein a value of a fourth detection node identifier comprised in the fourth reported detection information is smallest in all reported detection information, comprising the fourth sequence number, that is received by the controller; and determining, by the controller, a packet loss locating node based on fourth collected data comprised in the fourth reported detection information.

14. The method according to claim 9, wherein the first detection information further comprises a flow identifier, and the flow identifier indicates a data flow to which the first data packet belongs.

15. A first network device, wherein the first network device comprises:

a non-transitory memory storing instructions; and
a processor coupled to the non-transitory memory; wherein the instructions, when executed by the processor, causes the first network device to:

receive first control information sent by a controller, wherein the first control information comprises a detection task type, and the detection task type indicates a detection task that the controller requires the first network device to perform;

receive a first data packet sent by a previous-hop network device of the first network device, wherein the first data packet comprises first detection information, the first detection information comprises a first detection node identifier, a first sequence number, and first collection information, the first detection node identifier indicates a location, in a detection domain, of a network device processing the first detection information, the first sequence number indicates a sequence number of the first data packet comprising the first detection information, the first collection information indicates collection information corresponding to the detection task type, the detection domain is a detection range determined by the controller, the detection domain comprises a plurality of network devices, and the plurality of network devices comprise the first network device;

determine, based on the first collection information, first collected data corresponding to the first collection information and update the first detection node identifier; and send, to a next-hop network device of the first network device, the first data packet carrying the updated first detection information.

16. The first network device according to claim 15, wherein the instructions, when executed by the processor, further cause the first network device to be configured to:
   encapsulate the first detection information into the first data packet after the first network device receives the first data packet sent by the previous-hop network device of the first network device.

17. The first network device according to claim 15, wherein the instructions, when executed by the processor, further cause the first network device to be configured to:
   delete the first detection information from the first data packet before the first network device sends the first data packet to the next-hop network device of the first network device.

18. The first network device according to claim 15, wherein the instructions, when executed by the processor, further cause the first network device to be configured to:
   send first reported detection information to the controller, wherein the first reported detection information comprises the updated first detection node identifier, the first sequence number, and the first collected data.

19. The first network device according to claim 15, wherein the detection task type is packet loss detection, the first control information further comprises a detection start moment and a detection end moment, the first network device is a head node device in the detection domain, the first data packet is the $1^{st}$ data packet sent, in a time period starting from the detection start moment, by the first network device to the next-hop network device of the first network device, and the first collected data comprises a device identifier of the first network device; wherein the instructions, when executed by the processor, further cause the first network device to be configured to:
   receive a second data packet sent by the previous-hop network device of the first network device;
   encapsulate second detection information into the second data packet, wherein the second detection information comprises a second detection node identifier, a second sequence number, and second collection information;
   determine, based on the second collection information, second collected data corresponding to the second collection information, and update the second detection node identifier, wherein the second collected data comprises the device identifier of the first network device, the second sequence number is greater than the first sequence number, and the second detection node identifier is the same as the first detection node identifier;
   send, to the next-hop network device of the first network device, the second data packet carrying the updated second detection information, wherein the second data packet is the last data packet sent by the first network device to the next-hop network device of the first network device before the detection end moment; and
   send first reported detection information and second reported detection information to the controller, wherein the first reported detection information comprises the updated first detection node identifier, the first sequence number, and the first collected data, and the second reported detection information comprises the updated second detection node identifier, the second sequence number, and the second collected data.

20. The first network device according to claim 15, wherein the detection task type is packet loss detection, the first control information further comprises a detection start moment and a detection end moment, the first network device is an intermediate node device or an end node device in the detection domain, and the first collected data comprises a device identifier of the first network device; wherein the instructions, when executed by the processor, further cause the first network device to be configured to:
   extend a value of the detection end moment by preset duration, and update the value of the detection end moment;
   receive, in a time period from the detection start moment to the updated detection end moment, a second data packet sent by the previous-hop network device of the first network device, wherein the second data packet comprises second detection information, and the second detection information comprises a second detection node identifier, a second sequence number, and second collection information;
   determine, based on the second collection information, second collected data corresponding to the second collection information, and update the second detection node identifier, wherein the second collected data comprises the device identifier of the first network device, the second sequence number is a largest sequence number in sequence numbers of a plurality of data packets that are received by the first network device in the time period, the first data packet is a data packet received by the receiver in the time period, and the first sequence number is a smallest sequence number in the sequence numbers of the plurality of data packets that are received by the first network device in the time period;
   send, to the next-hop network device of the first network device, the second data packet carrying the updated second detection information;
   generate third reported detection information, wherein the third reported detection information comprises a third detection node identifier, a third sequence number, and third collected data, the third detection node identifier is the same as the updated second detection node identifier, the third collected data comprises the device identifier of the first network device, the third sequence number is a sequence number missing from the sequence numbers of the plurality of data packets that are received by the first network device in the time period, and the third sequence number is greater than the first sequence number and less than the second sequence number; and
   send first reported detection information, second reported detection information, and the third reported detection information to the controller, wherein the first reported detection information comprises the updated first detection node identifier, the first sequence number, and the first collected data, and the second reported detection information comprises the updated second detection node identifier, the second sequence number, and the second collected data.

21. A controller, wherein the controller comprises:
   a non-transitory memory storing instructions; and
   a processor coupled to the non-transitory memory; wherein the instructions, when executed by the processor, causes the controller to:
   determine a detection domain, wherein the detection domain is a detection range, and the detection domain comprises a plurality of network devices;
   send first control information to the plurality of network devices, wherein the first control information comprises a detection task type, and the detection task type indicates a detection task that the controller requires the plurality of network devices to perform; and receive first reported detection information sent by a first network device, wherein the first reported detection information is determined by the first network device based on first detection information, the first detection information is detection information obtained by the first network device from a first data packet before the first network device sends the first data packet to a next-hop network device of the first network device, the first reported detection information comprises a first detection node identifier, a first sequence number, and first collected data, the first detection node identifier indicates a location, in the detection domain, of a network device processing the first detection information, the first sequence number indicates a sequence number of the first data packet comprising the first detection information, the first collected data is collected data, corresponding to first collection information, that is determined by the first network device based on the first collection information in the first detection information, the first collection information indicates collection information corresponding to the detection task type, and the plurality of network devices comprise the first network device.

22. The controller according to claim 21, wherein the detection task type is packet loss detection, the first control information further comprises a detection start moment and a detection end moment, the first network device is a head node device in the detection domain, the first data packet is the $1^{st}$ data packet sent, in a time period starting from the detection start moment, by the first network device to the next-hop network device of the first network device, and the first collected data comprises a device identifier of the first network device; wherein the instructions, when executed by the processor, further cause the controller to be configured to:
receive second reported detection information sent by the first network device, wherein the second reported detection information is determined by the first network device based on second detection information, the second detection information is detection information obtained by the first network device from a second data packet before the first network device sends the second data packet to the next-hop network device of the first network device, the second reported detection information comprises a second detection node identifier, a second sequence number, and second collected data, the second collected data comprises the device identifier of the first network device, the second sequence number is greater than the first sequence number, the second detection node identifier is the same as the first detection node identifier, and the second data packet is the last data packet sent by the first network device to the next-hop network device of the first network device before the detection end moment.

23. The controller according to claim 22, wherein the instructions, when executed by the processor, further cause the controller to be configured to:
receive third reported detection information sent by a second network device, wherein the third reported detection information comprises a third detection node identifier and third collected data, the third detection node identifier indicates a location of the second network device in the detection domain, the third collected data comprises a device identifier of the second network device, the third reported detection information further comprises a third sequence number, a fourth sequence number, and a fifth sequence number, the third sequence number is a smallest sequence number in sequence numbers of a plurality of data packets received by the second network device in a time period from the detection start moment to a moment obtained by extending the detection end moment by preset duration, the fourth sequence number is a sequence number missing from the sequence numbers of the plurality of data packets received by the second network device in the time period, the fifth sequence number is a largest sequence number in the sequence numbers of the plurality of data packets received by the second network device in the time period, the second network device is an intermediate node device or an end node device in the detection domain, and the plurality of network devices comprise the second network device.

24. The controller according to claim 23, wherein the instructions, when executed by the processor, further cause the controller to be configured to:
determine a packet loss rate based on the first reported detection information, the second reported detection information, and the third reported detection information.

25. The controller according to claim 23, wherein the instructions, when executed by the processor, further cause the controller to be configured to:
determine fourth reported detection information based on the fourth sequence number, wherein a value of a fourth detection node identifier comprised in the fourth reported detection information is smallest in all reported detection information, comprising the fourth sequence number, that is received by the controller; and
determine a packet loss locating node based on fourth collected data comprised in the fourth reported detection information.

* * * * *